United States Patent
Clarke et al.

(10) Patent No.: US 9,906,585 B2
(45) Date of Patent: *Feb. 27, 2018

(54) ASSESSMENT OF HOSTING SUITABILITY OF MULTIPLE APPLICATIONS IN A CLOUD

(71) Applicant: CA, INC., New York, NY (US)

(72) Inventors: Allan D. Clarke, Austin, TX (US); Douglas M. Neuse, Austin, TX (US)

(73) Assignee: CA, Inc., New York, NY (US)

(*) Notice: Subject to any disclaimer, the term of this patent is extended or adjusted under 35 U.S.C. 154(b) by 640 days.

This patent is subject to a terminal disclaimer.

(21) Appl. No.: 14/277,889

(22) Filed: May 15, 2014

(65) Prior Publication Data

US 2015/0288579 A1     Oct. 8, 2015

Related U.S. Application Data

(63) Continuation of application No. 14/245,711, filed on Apr. 4, 2014.

(51) Int. Cl.
    *H04L 12/26*      (2006.01)
    *G06F 11/34*      (2006.01)
    (Continued)

(52) U.S. Cl.
    CPC .......... *H04L 67/10* (2013.01); *G06F 11/3409* (2013.01); *H04L 41/5009* (2013.01);
    (Continued)

(58) Field of Classification Search
    CPC . H04L 47/822; H04L 47/828; H04L 63/0272; H04L 67/32; H04L 29/08144;
    (Continued)

(56) References Cited

U.S. PATENT DOCUMENTS 7,516,042 B2 * 4/2009 Glas .................... G06F 11/3433
                                                       455/405
8,868,749 B2   10/2014 Bartfai-Walcott et al.
                 (Continued)

OTHER PUBLICATIONS

Google Patent Search Results: determine maximum quantity of software applications on a cloud node, Jul. 8, 2016.*
(Continued)

*Primary Examiner* — Patrice Winder
*Assistant Examiner* — Ruth Solomon
(74) *Attorney, Agent, or Firm* — Baker Botts L.L.P.

(57) ABSTRACT

In accordance with the teachings of the present disclosure, a method of assessment of hosting suitability of multiple applications in a cloud is disclosed. The method may include defining, in a first synthetic application definition, a first plurality of resource consumptions, wherein the first plurality of resource consumptions are equivalent to consumptions by a first candidate application, and defining, in a second synthetic application definition, a second plurality of resource consumptions, wherein the second plurality of resource consumptions are equivalent to consumptions by a second candidate application. The method may also include consuming quantities of resources of pluralities of nodes of the computing system, recording performances of the synthetic, and evaluating the computing system based upon the recorded performances. The present disclosure additionally includes associated systems and apparatuses.

20 Claims, 15 Drawing Sheets

(51) Int. Cl.
*H04L 29/08* (2006.01)
*H04L 12/24* (2006.01)
*H04L 12/911* (2013.01)

(52) U.S. Cl.
CPC ...... *H04L 41/5038* (2013.01); *H04L 41/5096* (2013.01); *H04L 43/04* (2013.01); *H04L 67/1008* (2013.01); *H04L 41/0806* (2013.01); *H04L 47/70* (2013.01)

(58) Field of Classification Search
CPC ....... H04L 41/147; H04L 43/08; H04L 43/50; H04L 47/805; H04L 67/10; H04L 67/30; H04L 67/303; H04L 41/0806; H04L 41/5009; H04L 41/5038; H04L 41/5096; H04L 43/04; H04L 47/70; H04L 67/1008; G06F 2209/5019; G06F 11/3409
See application file for complete search history.

(56) References Cited

U.S. PATENT DOCUMENTS

| | | | |
|---|---|---|---|
| 8,930,908 B2 | 1/2015 | Bloching et al. | |
| 9,020,794 B2* | 4/2015 | Chen | G06F 9/50 703/13 |
| 9,032,373 B1* | 5/2015 | Gupta | G06F 11/3688 717/127 |
| 9,210,031 B1* | 12/2015 | Kirby | G06F 9/5027 |
| 9,213,581 B2* | 12/2015 | Klemba | G06F 9/5072 |
| 9,444,760 B2 | 9/2016 | Breiter et al. | |
| 2006/0047542 A1* | 3/2006 | Aschoff | G06Q 40/02 709/223 |
| 2008/0172581 A1* | 7/2008 | Glas | G06F 11/3433 714/38.12 |
| 2008/0270998 A1 | 10/2008 | Zambrana et al. | |
| 2011/0106519 A1 | 5/2011 | Samper | |
| 2012/0054771 A1 | 3/2012 | Krishnamurthy | |
| 2012/0159445 A1 | 6/2012 | Bloching et al. | |
| 2012/0185868 A1* | 7/2012 | Bartfai-Walcott | G06F 9/445 718/105 |
| 2013/0185433 A1* | 7/2013 | Zhu | H04L 67/303 709/226 |
| 2013/0246589 A1* | 9/2013 | Klemba | G06F 9/5072 709/221 |
| 2014/0006624 A1* | 1/2014 | Chen | G06F 9/50 709/226 |
| 2014/0047084 A1 | 2/2014 | Breternitz | |
| 2014/0047095 A1 | 2/2014 | Breternitz | |
| 2014/0047272 A1* | 2/2014 | Breternitz | G06F 11/3495 714/32 |
| 2014/0047342 A1* | 2/2014 | Breternitz | G06F 9/5061 715/735 |
| 2014/0068053 A1* | 3/2014 | Ravi | G06F 9/5072 709/224 |
| 2014/0089509 A1* | 3/2014 | Akolkar | H04L 41/147 709/226 |
| 2014/0095720 A1* | 4/2014 | Breiter | H04L 41/0806 709/226 |
| 2014/0215487 A1 | 7/2014 | Cherkasova et al. | |
| 2014/0344805 A1* | 11/2014 | Shu | G06F 9/45558 718/1 |
| 2015/0033239 A1 | 1/2015 | Heilper | |
| 2015/0163179 A1* | 6/2015 | Maes | G06F 9/546 709/206 |
| 2015/0278066 A1* | 10/2015 | France | G06F 11/3428 709/224 |

OTHER PUBLICATIONS

Google Patent Search Results: load testing different user usage levels of same web application, Jul. 20, 2016.*
Google Patent Search Results: load testing different user usage levels of same web application instance cloud, Jul. 20, 2016.*
Google Patent Search Results: performance resource consumption testing multiple applications in a cloud, Jul. 22, 2016.*
Google Patent Search Results: plurality of synthetic application profile for testing cloud node, Jul. 22, 2016.*
Google Patent Search Results: stress testing synthetic user levels of application instance doud, Jul. 22, 2016.*
U.S. Appl. No. 14/245,711 ; pp. 83, dated Apr. 4, 2014.
U.S. Appl. No. 14/277,934 ; pp. 85, dated May 15, 2014.
U.S. Appl. No. 14/277,967 ; pp. 81, dated May 15, 2014.
U.S. Appl. No. 14/278,008 ; pp. 81, dated May 15, 2014.
U.S. Appl. No. 14/278,047 ; pp. 84, dated May 15, 2014.
U.S. Appl. No. 14/186,499; pp. 39, dated Feb. 21, 2014.
United States Patent and Trademark Office, Non-Final Office Action issued in U.S. Appl. No. 14/245,711, dated May 25, 2016.
United States Patent and Trademark Office, Final Rejection issued in related U.S. Appl. No. 14/278,008, dated Jan. 12, 2017.
United States Patent and Trademark Office, Non-Final Rejection issued in related U.S. Appl. No. 14/278,008, dated Nov. 4, 2016.
United States Patent and Trademark Office, Non-Final Rejection issued in related U.S. Appl. No. 14/277,934, dated Oct. 4, 2016.
United States Patent and Trademark Office, Non-Final Rejection issued in related U.S. Appl. No. 14/277,967, dated Oct. 4, 2016.
United States Patent and Trademark Office, Non-Final Rejection issued in related U.S. Appl. No. 14/278,047, dated Oct. 4, 2016.

* cited by examiner

ASSESSMENT OF HOSTING SUITABILITY OF MULTIPLE APPLICATIONS IN A CLOUD

CROSS-REFERENCE TO RELATED APPLICATION

The present application is a continuation application of copending U.S. patent application Ser. No. 14/245,711 filed Apr. 4, 2014, which is hereby incorporated by reference in its entirety for all purposes.

BACKGROUND

The present disclosure relates generally to information services infrastructure and network management, and more specifically, to application-specific assessment of cloud hosting suitability of nodes of a computer system. Computer systems may include many nodes communicatively coupled to one another via a network. Application code runs on computer systems. One application may have code running on various nodes of a computer system. Such a group of nodes may be referred to as a cloud.

Computing capacity of clouds may be used to run a variety of applications. However, computing capacity may be constrained by availability of one or more resources of nodes of the cloud, and in fact, may be insufficient to provide quality performance of a particular application. The present disclosure relates generally to systems and methods for application-specific assessment of cloud hosting suitability.

BRIEF SUMMARY

A method is disclosed, including defining, in a first synthetic application definition, a first plurality of resource consumptions, wherein the first plurality of resource consumptions are equivalent to consumptions by a first candidate application, and defining, in a second synthetic application definition, a second plurality of resource consumptions, wherein the second plurality of resource consumptions are equivalent to consumptions by a second candidate application. The method may additionally include distributing the first synthetic application definition to a first synthetic application in a node of a computing system, and distributing the second synthetic application definition to a second synthetic application in the node of the computing system. Further, the method may include consuming, with the first synthetic application and based on the first synthetic application definition, a first plurality of quantities of resources of a first plurality of nodes of the computing system, and consuming, with the second synthetic application and based on the second synthetic application definition, a second plurality of quantities of resources of a second plurality of nodes of the computing system. The method may also include recording a performance of the first synthetic application and a performance of the second synthetic application, and evaluating the computing system based upon the recorded performances.

A computer-readable storage medium, including computer-executable instructions carried on the computer readable medium is disclosed. The instructions readable by a processor and, when read and executed, configured to cause the processor to define, in a first synthetic application definition, a first plurality of resource consumptions, wherein the first plurality of resource consumptions are equivalent to consumptions by a first candidate application, and to define, in a second synthetic application definition, a second plurality of resource consumptions, wherein the second plurality of resource consumptions are equivalent to consumptions by a second candidate application. The instruction may further cause the processor to distribute the first synthetic application definition to a first synthetic application in a node of a computing system, and to distribute the second synthetic application definition to a second synthetic application in the node of the computing system. Additionally, the instructions may cause the processor to consume, with the first synthetic application and based on the first synthetic application definition, a first plurality of quantities of resources of a first plurality of nodes of the computing system, and to consume with the second synthetic application and based on the second synthetic application definition, a second plurality of quantities of resources of a second plurality of nodes of the computing system. The instruction may further cause the processor to record a performance of the first synthetic application and a performance of the second synthetic application, and to evaluate the computing system based upon the recorded performances.

An apparatus is disclosed, the apparatus including a processor, a memory communicatively coupled to the processor. The memory includes instructions that are operable, when executed for causing the processor to define, in a first synthetic application definition, a first plurality of resource consumptions, wherein the first plurality of resource consumptions are equivalent to consumptions by a first candidate application, and to define, in a second synthetic application definition, a second plurality of resource consumptions, wherein the second plurality of resource consumptions are equivalent to consumptions by a second candidate application. The instructions may further cause the processor to distribute the first synthetic application definition to a first synthetic application in a node of a computing system, and to distribute the second synthetic application definition to a second synthetic application in the node of the computing system. Additionally, the instructions may cause the processor to consume, with the first synthetic application and based on the first synthetic application definition, a first plurality of quantities of resources of a first plurality of nodes of the computing system, and to consume with the second synthetic application and based on the second synthetic application definition, a second plurality of quantities of resources of a second plurality of nodes of the computing system. Further, the instructions may cause the processor to record a performance of the first synthetic application and a performance of the second synthetic application, and to evaluate the computing system based upon the recorded performances.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

DETAILED DESCRIPTION

Figure 1:
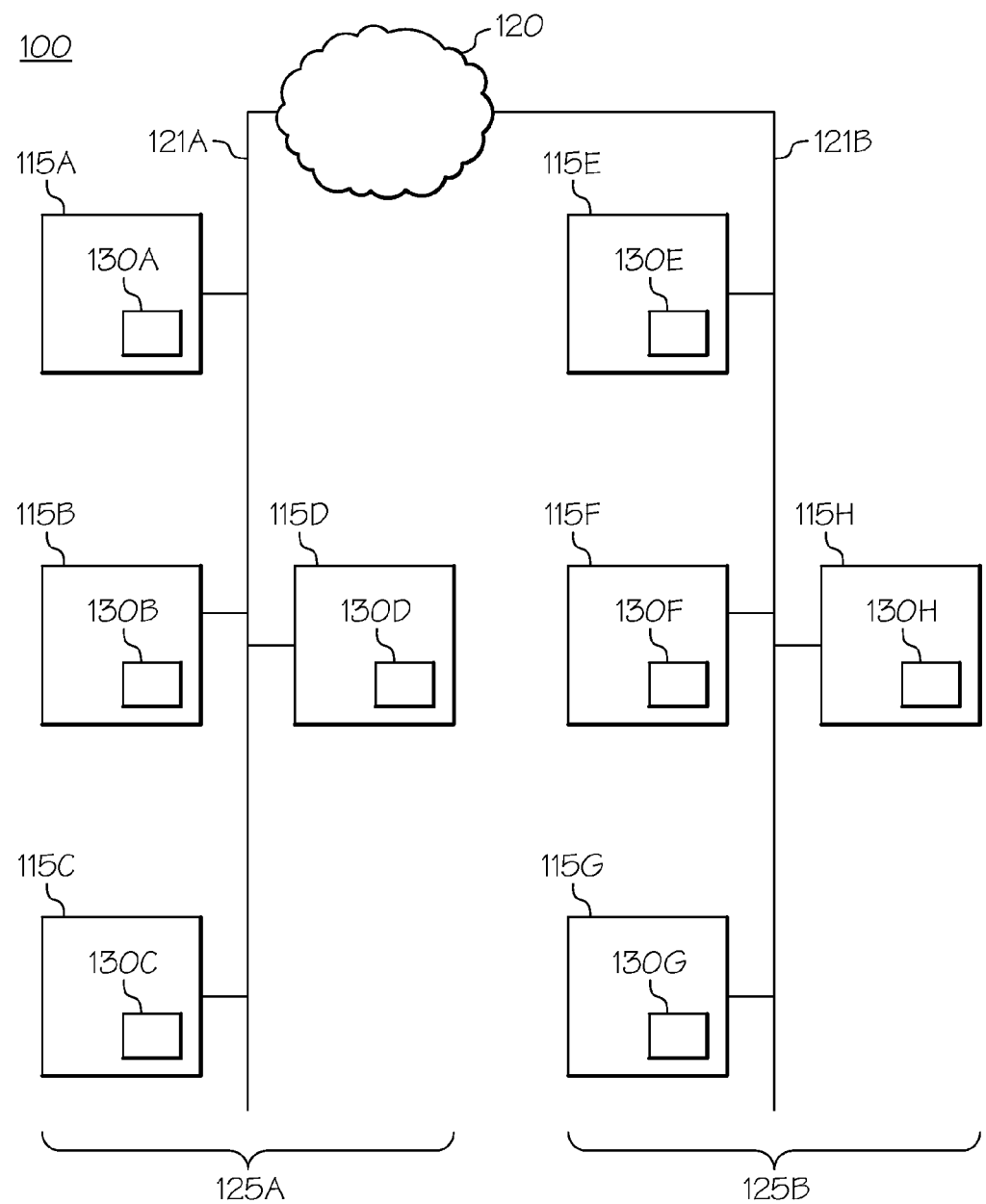
FIG. 1 is a block diagram depicting an exemplary system for application-specific assessment of cloud hosting suitability, in accordance with the teachings of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "node," "element," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), a digital versatile disk (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In accordance with the teachings of the present disclosure, a system may be provided that is configured to provide application-specific assessment of cloud hosting suitability. Particular embodiments and their advantages are best understood by reference to FIGS. 1 through 14, wherein like numbers are used to indicate like and corresponding parts.

FIG. 1 is a block diagram depicting an exemplary system 100 for application-specific assessment of cloud hosting suitability, in accordance with the teachings of the present disclosure. System 100 may include, for example, a plurality of nodes 115, network 120, and local networks 121. For example, each node 115 may include a server (e.g., blade server or rack server), personal computer (e.g., desktop or laptop), tablet computer, mobile device (e.g., personal digital assistant (PDA) or smart phone), network storage device, printer, switch, router, data collection device, virtual machine, script, executable, firmware, library, shared library, function, module, software application, or any other suitable device or application. The components or whole of node 115 may make up a resource. Furthermore, node 115 may include one or more resources, such as a processor, memory, peripheral, application, datastore, storage, function, card, board, or other physical or virtual device. Resources of nodes 115 may further include resources of network 120 connected to nodes 115, for example data transmission bandwidth, network connectivity, or any other components or functionality of network 120 or local networks 121. Although exemplary system 100 is shown in FIG. 1 as including a particular number of nodes 115, a system may include more than or fewer than the number of nodes 115 illustrated. Similarly, although exemplary system 100 is shown in FIG. 1 as including nodes 115 of particular types, a system may include nodes 115 of types other than those shown in FIG. 1.

Network 120 may include a network and/or fabric configured to communicatively couple nodes 115, synthetic applications 130, and/or any node associated with system 100. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system configured to facilitate the communication of signals, data and/or messages (generally referred to as data). Network 120 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof. Local networks 121 are typically implemented as local area networks, but may be implement as or part of any type of network, such as network 120. In some embodiments, local networks 120 may be implemented as components of network 120.

One or more nodes 115 may be disposed to host computer applications. For example, one or more nodes 115 may be disposed to host enterprise applications, including, but not limited to, internet web page hosting, internet based applications, database applications, e-commerce applications, or any other suitable application or combination of applications. Users of such applications may access nodes 115 disposed for hosting the application by using, for example, network 120 or local networks 121. A group of nodes 115 accessible via network 120 or local networks 121 may be referred to as cloud 125. For example, nodes 115A, 115B, 115C, and 115D may be jointly disposed to host applications. Nodes 115A, 115B, 115C, and 115D may be referred to collectively as cloud 125A. In some embodiments, nodes 115A, 115B, 115C, and 115D in cloud 125A may be interconnected by local network 121A. In other embodiments, nodes 115 in a cloud 125 may be interconnected by any other suitable connection, such as network 120 or local networks 121. Likewise, nodes 115E, 115F, 115G, and 115H may make up some or all of a different cloud 125B. In some embodiments, nodes 115E, 115F, 115G, and 115H in cloud 125B may be interconnected by local network 121B. In other embodiments, nodes 115 in a cloud 125 may be interconnected by any other suitable connection, such as network 120. Clouds 125 may include any number of nodes 115, and a single instance of node 115 may be included in one or more clouds. Nodes 115 in clouds 125 may be physically and/or logically distinct from other nodes 115 in clouds 125.

Cloud-based applications may include applications or groups of applications hosted on one or more clouds 125. Operators of clouds 125 may select particular cloud-based applications to be hosted by clouds 125, or may sell or give access to resources of clouds 125 to third-party customers. Clouds 125 may host any suitable number of applications at a particular time, including applications hosted for the benefit of one or more third-party customers.

Operators of clouds 125 may, for example, offer to sell Infrastructure as a Service (IaaS). Frequently, clouds 125 include one or more nodes 115 capable of hosting computer program code representing a virtual machine. Third-party customers may provide computer program code representing a virtual machine including one or more applications or portions of applications. Operators of clouds 125 may implement such computer program code on a particular physical machine. Implementing computer program code representing a virtual machine may be referred as "standing up" a virtual machine in a host. Clouds 125 may include physical machines configured to host virtual machines provided by different third-party customers.

Different nodes 115 in clouds 125 may include different resources. Some nodes 115 may include resources optimized for particular functions. For example, a particular node 115 intended for implementing a database may include above average storage resources and/or network resources. A particular node 115 intended for implementing graphics processing may include above average computer processing resources. Nodes 115 may, for example, be provisioned with resources optimized for particular tasks, or may be provisioned with any suitable group of resources.

Different cloud-based applications may consume different resources of nodes 115 and/or of clouds 125. Consuming or utilizing resources may include, for example, performing operations with, or otherwise exercising the functionality of a node or of a component of a node. For example, websites hosted in a computing system might require substantial network bandwidth to enable large numbers of users to simultaneously access the website. A computing system hosting a database application may require substantial throughput in read and write operations to a storage system. Likewise, a computing system hosting a graphics processing system may require substantial computer processing and/or memory resources to complete processing requests. If nodes 115 of clouds 125 have different amounts and/or types of available resources, one instance of cloud 125 may be more suitable for hosting a specific application than another instance of cloud 125. In some embodiments, availability of resources may depend on hardware configuration of a node. In other embodiments, availability of resources may depend on interactions with other applications running on a node. Synthetic applications 130 may be used to determine whether nodes 115 of clouds 125 are suitable for hosting a particular application or portion of application.

In some embodiments, synthetic applications 130 may be used to evaluate expected performance of one or more real-world cloud-based applications hosted on clouds 125. Typically, resources consumed by cloud-based applications may be described in terms of functionality or flow. Functionality or flow of a real-world application may, for example, include sequences of resource consumptions within particular nodes 115 and/or between one or more nodes 115. For example, one component of the functionality or flow of an exemplary cloud-based real-world application may include a user logging into a bank account on a website and retrieving account details. Such functionality or flow may include a node hosting a webpage which, upon receipt of a login request, queries a database of account details in another node. Real-world applications may be characterized by creating synthetic application definitions including business functions resembling the functionality or flow of these real-world applications. Business functions may specify sequences of resource consumptions. The functionality or flow of real-world applications may be emulated by configuring synthetic applications 130 to perform sequences of resource consumptions, as specified in business functions, based upon synthetic application definitions.

Synthetic applications may be configured to effectuate various types of resource consumptions. In some embodiments, synthetic applications may be configured to consume resources of a cloud responsive to a synthetic application definition based upon a real-world application. In other embodiments, synthetic applications may be configured to consume resources of a cloud responsive to multiple synthetic application definitions based upon behavior of real-world application at different levels of user demand. In further embodiments, synthetic applications may be configured to consume resources of multiple clouds responsive to a synthetic application definition based upon behavior of real-world application. In other embodiments, multiple synthetic applications may be configured to consume resources of a node of a cloud responsive to synthetic application definitions based upon behavior of multiple real-world applications. Although particular uses of synthetic applications are described, it will be understood that synthetic application may be used in any suitable configuration, including combinations of configurations described herein.

In one embodiment, synthetic applications 130 may be used to perform application-specific assessments of cloud hosting suitability. Each node 115 may include one or more instances of synthetic application 130. Each synthetic application 130 within a node 115 may include a physical or logical node communicatively coupled to other synthetic applications 130 within other nodes 115 via network 120. Synthetic applications 130 may be configured to consume resources of nodes 115 as they are configured within system 100.

Figure 2:
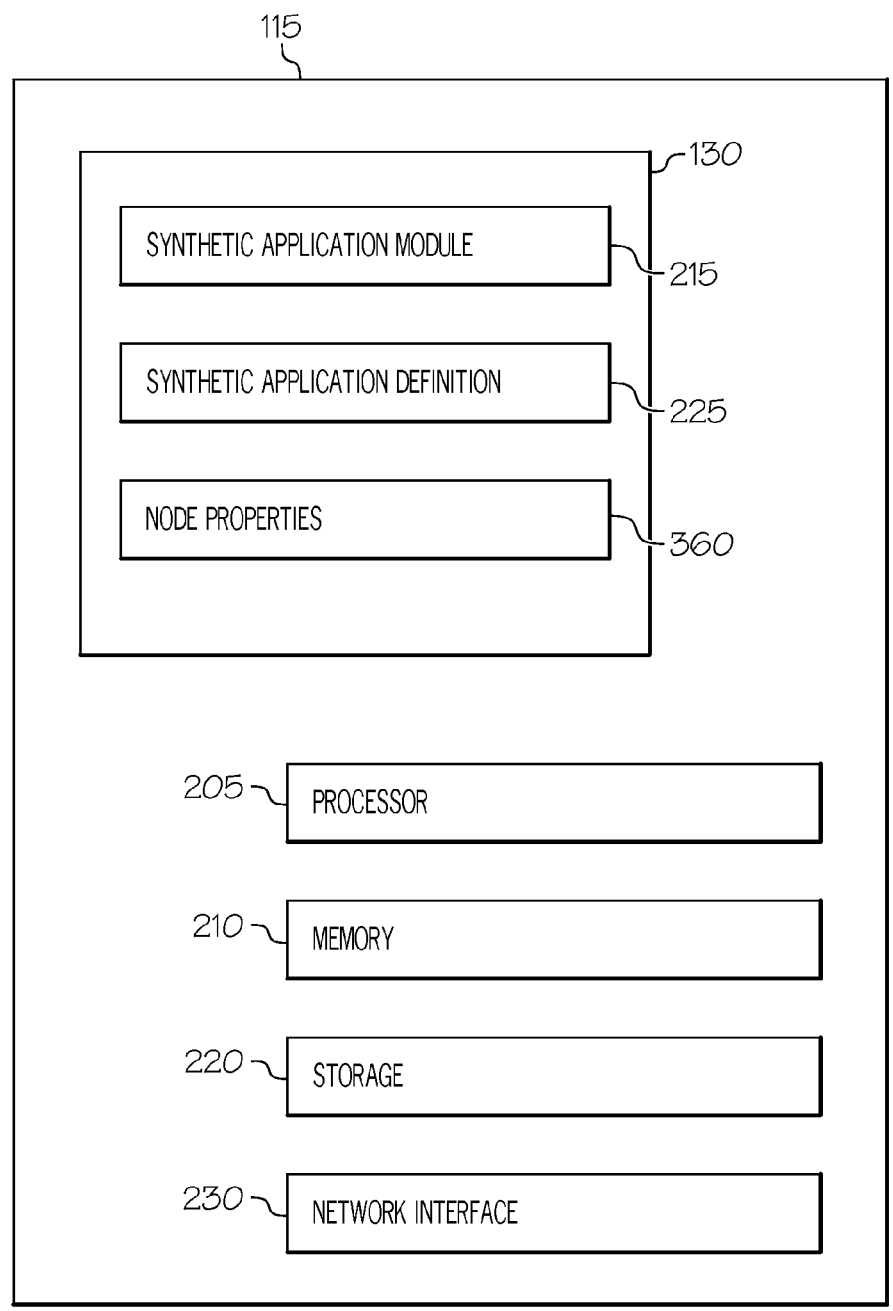
FIG. 2 is an illustration of a synthetic application, in accordance with the teachings of the present disclosure.

FIG. 2 is an illustration of a synthetic application 130, in accordance with the teachings of the present disclosure. FIG. 2 illustrates an exemplary node 115 containing a synthetic application 130. In some embodiments of the invention, nodes 115 may include processor 205, memory 210, storage device 220, and/or network interface 230. Instances of synthetic application 130 may include synthetic application module 215. Instances of synthetic application 130 may further include synthetic application definition 225, and/or node properties 360. Although node 115 is illustrated as including processor 205, memory 210, and storage device 220, node 115 may include any suitable number or kind of resources that may be used by synthetic application 130.

Processor 205 may be communicatively coupled to memory 210 and synthetic application module 215. Processor 205 may include any system, device, or apparatus operable to interpret and/or execute program instructions and/or process data, and may include, without limitation, a microprocessor, a microcontroller, a digital signal processor (DSP), an application specific integrated circuit (ASIC), or any other digital or analog circuitry configured to interpret and/or execute program instructions and/or process data.

Synthetic application module 215 may include computer-program instructions resident in memory 210 (or another computer-readable medium communicatively coupled to synthetic application 130) and capable of being executed by processor 205. Memory 210 may be configured in part or whole as application memory, system memory, or both. Memory 210 may include any system, device, or apparatus configured to hold and/or house one or more memory modules. Each memory module may include any system, device or apparatus configured to retain program instructions and/or data for a period of time (e.g., computer-readable storage media). The computer-program instructions resident in memory 210, when executed by processor 205 may perform the functionality of synthetic application 130 or synthetic application module 225, as described herein.

Synthetic application module 215 may further include computer-program instructions configured to characterize total processing power capacity of nodes 115. Total processing power capacity may describe a platform independent amount of processing resource consumptions that a particular node 115 is capable of performing in a period of time. Typically, a particular real-world application may take different amounts of time to execute operations or portions of computer program code on different nodes 115. For example, if a first node 115 has a particular total processing power capacity, and a second node 115 has a particular total processing power capacity twice that of the first node 115, a particular set of computer-program instructions may, in the absence of interference from other sets of computer-program instructions, execute approximately twice as fast on the second node 115 as the first node 115. In part, this difference may arise because different nodes 115 may have different resource provisions. For example, nodes 115 may have different amounts of processing resources, memory resources, storage resources, network resources, and/or other resources related to infrastructure assets that can be described in terms of quantity and/or rate and/or usage of components nodes 115.

In some embodiments, synthetic applications modules 215 may be configured to determine total processing power capacity of a node 115. Typically, processing speed of processors, such as processor 205, may be limited by one or more different types of processing resource consumptions. For example, processing speed may be limited by capacities of floating point units, sizes of various caches, sets of registers, various busses, or any other component, element, module or functionality of any component of node 115. In some embodiments, to determine total processing power capacity, synthetic application module 215 may execute multiple loops of a set of computer-program instructions. Each loop may perform one or more instances of a variety of typical processing resource consumptions, such as floating point calculations, Fibonacci calculations, sorting tasks, "card shuffling" tasks, data compression and decompression tasks, prime number calculations, sequence searching, or any other suitable type of processing resource consumption. Each type of processing resource consumption may have an associated weighting so that more, fewer, or equal processing resources are consumed for that type of processing resource consumption per loop as compared to other types. In some embodiments, the weightings may be adjusted and the implementation may be run on various architectures until the resources consumed by executing computer-program instructions based on the resulting set of weightings are proportional to total processing power capacity.

Synthetic application modules 215 may be configured to consume resources of nodes 115 in any suitable manner or degree, such as a similar manner or degree as a real-world application or group of applications would consume resources of nodes 115. Such resources may include, but are not limited to, processing resources, memory resources, storage resources, network resources, and/or other resources related to infrastructure assets that can be described in terms of quantity and/or rate and/or usage of components nodes 115. Synthetic applications modules 215 may be further configured to issue requests via network 120 for other instances of synthetic application 130 to consume resources of nodes 115. Synthetic applications modules 215 may be configured to issue replies via network 120, after consuming resources in response to a request. Where a single resource is referenced, it may be understood that multiple resources may be consumed.

Synthetic application modules 215 may be configured to collect data corresponding to the performance of resources of nodes 115. Performance of resources of nodes 115 may include any suitable performance metric, such as response times, proportion of successfully executed operations, consumptions, or utilizations. Data related to the performance of a resource may include values representing a measure of a particular performance metric. For example, synthetic application modules 215 may be configured to commence measuring a time duration upon an event initiating a resource consumption. Synthetic application modules 215 may be configured to cease measuring a time duration upon an event terminating a resource consumption. Synthetic application modules 215 may be configured to measure a time duration between issuing a resource consumption request to another instance of synthetic application 130 and receiving a reply. Analysis of data relating to the performance of a resource may indicate the suitability of nodes 115 for hosting particular real world applications with resource consumptions similar to resource consumptions of synthetic applications 130.

In some embodiments, data collected by synthetic application module 215 may be stored in memory 210 and/or storage 220. Memory 210 and/or storage 220 may include a database, directory, or other data structure operable to store data. Further, memory 210 and/or storage 220 may include any instrumentality or aggregation of instrumentalities that may retain data and/or instructions for a period of time. Storage 220 may include random access memory (RAM), electrically erasable programmable read-only memory (EEPROM), a Personal Computer Memory Card International Association (PCMCIA) card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory operable to store data. Performance data consisting of, for example, time durations of resource consumption may be stored in an array, a database, a matrix, or any other suitable data structure for storing performance data.

In some embodiments, synthetic application modules 130 or nodes 115 may be configured to communicate with other synthetic application modules 103 or nodes 115 using network interface 230. Network interface 230 may include any adapter or hardware operable to communicate using network 120, such as hardware or circuitry for connecting to network connection such as Fibre Channel, Frame Relay, Asynchronous Transfer Mode (ATM), Internet protocol (IP), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), integrated drive electronics (IDE), and/or any combination thereof.

Each synthetic application 130 may be implemented in any suitable portion of node 115. Although each node 115 is illustrated as containing a synthetic application 130, in various embodiments synthetic application 130 may be implemented in only a portion of nodes 115. Furthermore, in various other embodiments, multiple instances of synthetic application 130 may be implemented in various ones of nodes 115. Instances of synthetic application 130 may be communicatively coupled to other instances of synthetic application 130 via network 120.

Figure 3:
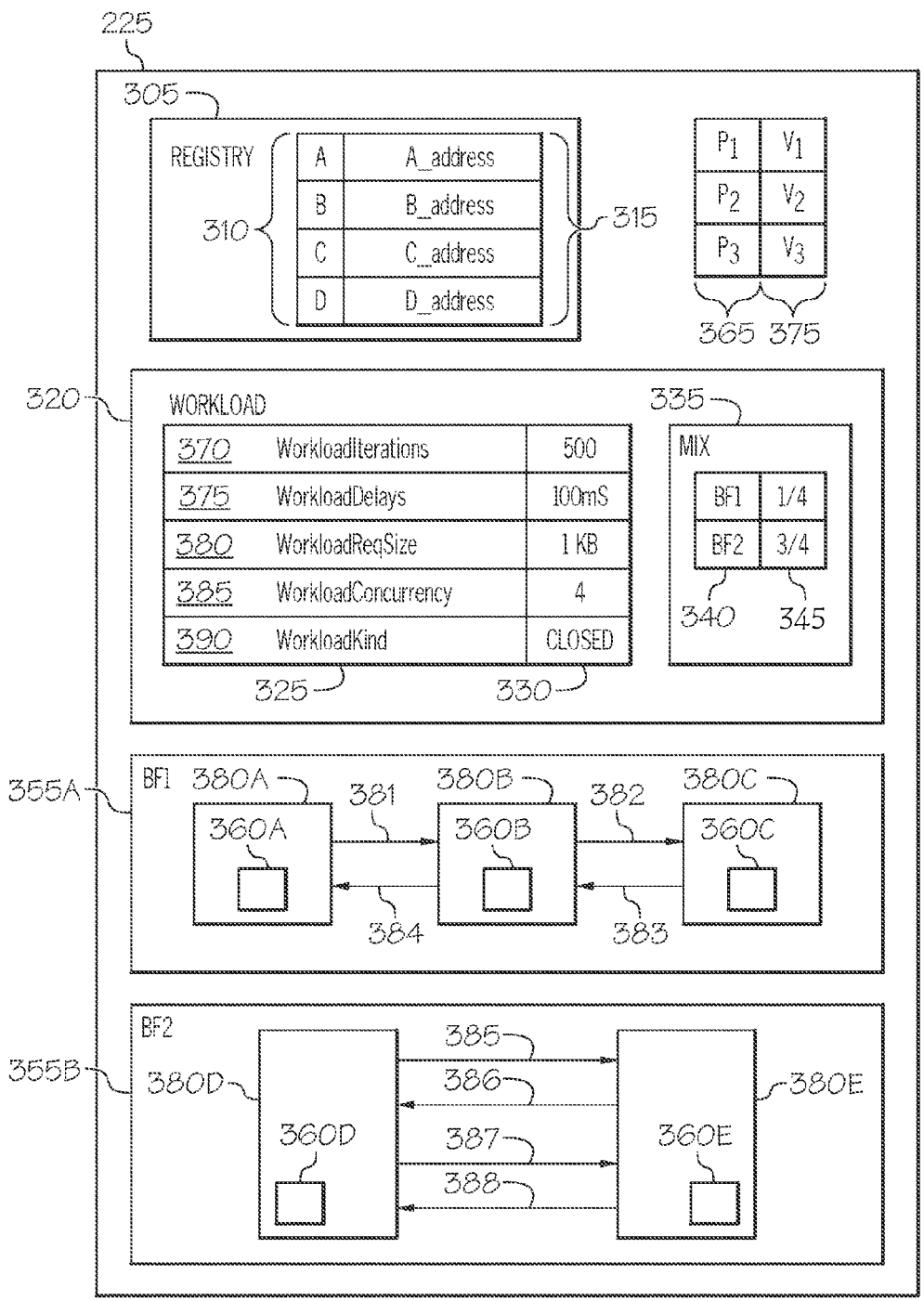
FIG. 3 is an illustration of a synthetic application definition, in accordance with the teachings of the present disclosure.

FIG. 3 is an illustration of synthetic application definition 225, in accordance with the teachings of the present disclosure. Synthetic application modules 215 may be configured to consume different resources or groups of resources of nodes 115 based upon synthetic application definition 225, as shown in FIG. 3.

Synthetic application definition 225 may include registry 305. Registry 305 may include one or more lists 310 of nodes 115 in system 100. Lists 310 may include references to all nodes 115 in system 100 or to a subset of all nodes 115. For example, list 310 may include references to only those nodes 115 described in instances of business functions 355. In addition to list 310, registry 305 may also include addresses 315. Addresses 315 may correspond to, for example, nodes 115 or instances of synthetic application 130. For example, addresses 315 may any include any suitable address, such as an internet protocol (IP) address.

Synthetic application definition 225 may also include one more workloads 320. Workloads 320 may include any suitable number or kind of parameters 325 specifying the operation of synthetic application 130. Parameters 325 may have corresponding values 330.

In some embodiments, an instance of synthetic application 130 may be configured as a supervisor instance. Supervisor instances of synthetic application 130 may control the configuration of others instances of synthetic applications 130. In other embodiments, an instance of synthetic application 130 may be configured as a master instance. Master instances of synthetic application 130 may initiate resource consumptions based upon workloads 320. In some embodiments, master instances of synthetic applications 130 may be configured to implement the functionality of master instances, supervisor instances, or a combination of the two. In other embodiments, supervisor instances of synthetic applications 130 may be configured to implement the functionality of master instances, supervisor instances, or a combination of the two.

Synthetic application 130 may be configured to implement business functions 355 one or more times. Thus, parameters 325 of workload 320 may include a number of iterations to implement business functions 355. Such a parameter may include, for example, WorkloadIterations 370. Values 330 associated with this parameter may include any suitable representation of a number of iterations, such as an integral number.

Iterations of business functions 355 may be temporally spaced apart from each other by a delay. Thus, workload 320 may include parameters 325 specifying a delay between consecutive iterations of synthetic application 130. Such a parameter may include, for example, WorkloadDelay 375. Values 330 associated with this parameter may include any suitable representation of a delay period, such as time durations, or duration of execution of a set of computer-program instructions.

Workload 320 may include a parameter specifying a payload size of synthetic application 130. Such a parameter may include, for example WorkloadReqSize 380. Synthetic application definitions may specify one or more instances of synthetic application 130 configured to autonomously initiate resource consumptions based on workloads 320. Such instances of synthetic application 130 may be referred to as master instances.

Master instances of synthetic applications 130 may initiate resource consumptions by transmitting data via network 120 to one or more other instances of synthetic application 130. In some embodiments, transmitted data may include requests for resource consumptions. In other embodiments, transmitted data may additionally include payload data. Payload data may include segments of data to be transmitted to another instance of synthetic application 130. Associated values 330 may describe any suitable measure of sizes of payloads to be transmitted via network 120, such as numbers of bytes.

Synthetic application 130 may be configured to perform only one iteration at a time, or, alternatively, may be configured to perform one or more iterations in parallel. Workload 320 may include a parameter 325 specifying the maximum number of iterations of synthetic application 130 that can be performed concurrently. Such a parameter may include, for example, WorkloadConcurrency 385. Concurrency may also be referred to as the degree of parallelism of synthetic application 130. Values 330 of this parameter may include any suitable value for specifying a degree of parallelism, such as an integral number.

If synthetic application 130 is configured to effectuate more than one concurrent iteration, workload 320 may additionally include a parameter 325 such as WorkLoadKind 390, describing whether iterations of synthetic application 130 may be executed synchronously or asynchronously. If iterations of synthetic application 130 may be executed synchronously, synthetic application 130 may be configured to wait for an iteration of resource consumptions initiated by synthetic application 130 to complete before launching a subsequent iteration of synthetic application 130. If synthetic application 130 may be executed asynchronously, synthetic application 130 may be configured to launch a subsequent iteration of synthetic application 130 before a previous iteration of synthetic application 130 has completed. Values 330 of this parameter may be include any suitable representation of whether synthetic application 130 is to be executed synchronously or asynchronously, such as a Boolean value, or a string. In some embodiments, a particular workload may be defined to operate synchronously. In other embodiments a workload may be defined to operate asynchronously. In further embodiments, a portion of a workload may be defined to operate synchronously, while a different portion of the workload may be defined to operate asynchronously.

Synthetic application 130 may be configured to effectuate any number of iterations of one or more business functions 355. In some embodiments, if synthetic application definition 225 specifies multiple iterations of more than one business function 355, iterations may be allocated equally between instances of business functions 355. In other embodiments, workload 320 may include a mix 335 of business functions 355. Mix 335 may include mix parameters 340 and mix values 345. Mix parameters 340 may describe proportions of iterations to be allocated to particular business functions 355. Instances of mix parameters 340 may reference particular business functions 355. Mix values 345 may include any suitable description of a proportion of iterations to be allocated to particular instances of business functions 355, such as a fraction, a percentage, a count.

Workload 320 may also include any other suitable parameter specifying the operation of synthetic application 130.

In some embodiments of the present disclosure, synthetic application definition 225 may enumerate one or more business functions 355. Business functions 355 may include sequences of resource consumptions of nodes 115 of system 100. Business functions 355 may, for example, describe sequences of resources of one or more nodes 115 to be consumed by synthetic application 130. Resources of particular nodes 115 may be included in one or more business functions 355. Further, resources of particular nodes 115 may be included one or more times within particular business functions 355. Business functions 355 may include associated node properties 360 for one or more nodes 115 included in sequences of resource consumptions.

Business functions 355 may describe a hierarchical sequence of resource consumptions across multiple instances of synthetic application 130. Business functions 355 may specify that various instances of synthetic application 130 initiate resource consumptions in response to initiating events. For example, business functions 355 may specify one or more instances of synthetic application 130 configured to initiate resource consumptions autonomously based on workloads 320. Such instances of synthetic application 130 may be referred to as master instances. A master instance may control the configuration of others instances of synthetic application 130. In other embodiments, instances of synthetic applications 130 may be configured to initiate resource consumptions of nodes 115 described in business functions 355 upon any other suitable initiating event, such as receipt of a request from another instance of synthetic application 130. Requests may include any suitable forms of requests, such as a data transmission via network 120.

For example, business functions 355 may describe initiating resource consumptions of nodes 115 based upon resource consumption of network 120 connected to an instance of synthetic application 130 within nodes 115. A particular instance of synthetic application 130 configured to send an initiating event to another instance of synthetic application 130 may be referred to as a parent. An instance of synthetic application 130 configured to initiate resource consumptions of nodes 115 based upon receipt of an initiating event may be referred to as a child. Instances of synthetic application 130 configured as children may send replies to instances of synthetic application 130 configured as parents after consuming resources of nodes 115 as described in business functions 355. Replies may include any suitable forms of replies, such as a data transmission via network 120.

One type of resource consumption described in business functions 355 may specify that, upon receiving a request from another instance of synthetic application 130 configured as a parent, an instance of synthetic application 130 in a particular node 115 may send one or more requests to other instances of synthetic applications 130. Thus, a single instance of synthetic application 130 may be configured as both a parent and a child depending on the context of the request/reply relationship with other instances of synthetic application 130.

For example, exemplary business function 355A may include instances of synthetic application 380A, 380B, and 380C, each with associated node properties 360A, 360B, and 360C, respectively. Exemplary business function 355A may begin, based upon workload 320, with synthetic application 380A consuming resources of an associated node 115, according to node properties 360A. Business function 355A may further specify that synthetic application 380A, after consuming resources of associated node 115, send request 381 to synthetic application 380B. Exemplary business function 355A may further specify that synthetic application 380B consume resources of an associated node 115, according to node properties 360B. Business function 355A may further specify that synthetic application 380B, after consuming resources of associated node 115, send request 382 to synthetic application 380C. Exemplary business function 355A may further specify that synthetic application 380C consume resources of an associated node 115, according to node properties 360C. Business function 355A may further specify that synthetic application 380C, after consuming resources of associated node 115, send reply 383 to synthetic application 380B. Business function 355A may further specify that synthetic application 380B, after consuming resources of associated node 115, send reply 384 to synthetic application 380A.

Exemplary business function 355B may include instances of synthetic application 380D and 380E, each with associated node properties 360D and 360E, respectively. Exemplary business function 355B may begin, based upon workload 320, with synthetic application 380D consuming resources of an associated node 115, according to node properties 360D. Business function 355B may further specify that synthetic application 380D, after consuming resources of associated node 115, send request 385 to synthetic application 380E. Exemplary business function 355B may further specify that synthetic application 380E consume resources of an associated node 115, according to node properties 360E. Business function 355B may further specify that synthetic application 380E, after consuming resources of associated node 115, send request 386 to synthetic application 380D. Exemplary business function 355B may further specify that synthetic application 380D consume resources of an associated node 115, according to node properties 360D. Business function 355B may further specify that synthetic application 380D, after consuming resources of associated node 115, send reply 387 to synthetic application 380E. Business function 355B may further specify that synthetic application 380E, after consuming resources of associated node 115, send reply 388 to synthetic application 380D.

In some embodiments of the present disclosure, synthetic application definition 225 may include default parameters 365. If one or more parameters of an instance of node properties 360 of synthetic application definition 225 do not have an assigned value, parameters may be assigned values with reference to default parameters 365. Default parameters 365 may include, for example, some or all of the parameters included in node properties 360. Parameters of node properties 360, such as parameters 402 may be assigned values 404, based upon default parameters values 375. A particular instance of synthetic application definition 225 may have different default parameters 365 than another instance of synthetic application definition 225.

Figure 4:
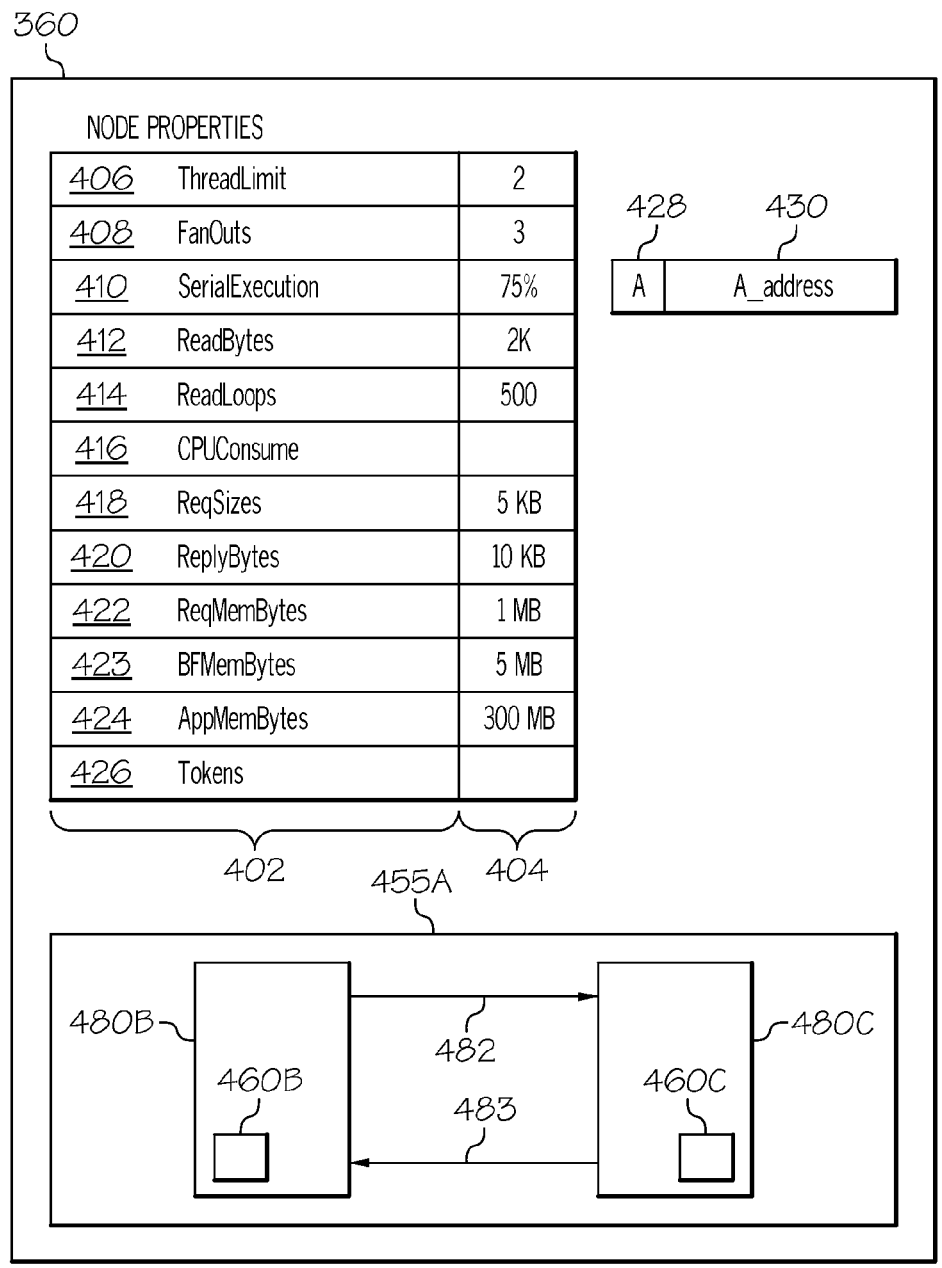
FIG. 4 is an illustration of node properties, in accordance with the teachings of the present disclosure.

FIG. 4 is an illustration of node properties 360, in accordance with the teachings of the present disclosure. Node properties 360, as shown in FIG. 4 may describe resource consumptions of nodes 115. Such resource consumptions may include, but are not limited to, processing resources, memory resources, storage resources, network resources, and other resources related to infrastructure assets that can be described in terms of quantity and/or rate and/or usage of components nodes 115. In some embodiments of the present disclosure, resource consumptions may include, for example, sending data between nodes 115 via network 120, executing computer program instructions on a computer processor, writing and/or reading to and/or from a storage device, writing and/or reading to or from a memory, or any other suitable resource consumption or combination of resource consumptions. Where a single resource is referenced, it may be understood that multiple resources may be consumed. Node properties 360 may include consumption parameters 402 with associated consumption values 404.

Node properties 360 may include parameters describing protocols for consuming of resources of nodes 115 in response to multiple initiating events. For example, node properties 360 may include properties such as ThreadLimit 406. ThreadLimit 406 may describe a maximum number of groups of resource consumptions that synthetic application 130 can effectuate concurrently, wherein each group of resource consumptions is responsive to a particular initiating event. If more than one concurrent operation is described in ThreadLimit 406, synthetic application 130 may consume resources of nodes 115 based upon multiple initiating events concurrently. If synthetic application 130 is configured by ThreadLimit 406 to effectuate only a single concurrent operation, resource consumptions responsive to a first initiating event must be completed before commencing resource consumptions responsive to a subsequent initiating event. Associated consumption values 404 may describe any suitable representation of a maximum number of concurrent consumptions, such as an integral number.

Node properties 360 may describe a number requests for resource consumptions to be sent by an instance of synthetic application 130 configured as a parent to an instance of synthetic application 130 configured as a child. In some embodiments, after consuming resources of a node 115, synthetic application 130 may send a single request to another instance of synthetic application 130 configured as a child via network 120. In other embodiments, synthetic application 130 may send more than one request to another instance of synthetic application 130 configured as a child via network 120. Node properties 360 may include consumption parameters 402, such as FanOuts 408, describing numbers of requests to be sent. Associated consumption values 404 may describe number of requests in any suitable format, such as an integral number, Node properties 360 may also describe proportions of temporal overlap between multiple types of resource consumptions responsive to a single initiating event. Node properties 360 may include consumption parameters 402, such as SerialExecution 410, describing proportions of temporal overlap between different types of resource consumptions. For example, node properties 360 may describe consuming storage resources of nodes 115 and processor resources of nodes 115. If, for example, consumption values 404 associated with SerialExecution 410 describe no permissible temporal overlap, storage resource consumptions may be completed before synthetic application 130 begins consuming processor resources of node 115, or vice versa. In other embodiments, if consumption values 404 associated with SerialExecution 410 describe permissible temporal overlap, storage resource consumptions may effectuated concurrently, or partially concurrently, with processor resource consumptions of node 115. Associated consumption values 404 may include any other suitable description of a proportion temporal overlap between resource consumptions of nodes 115, such as fractions, percentages, counts, binary values, or Boolean statements.

Node properties 360 may describe consumption of storage resources of nodes 115. In some embodiments of the present disclosure, resource consumptions may include sequences of read and write operations to storage resources of one or more nodes 115. Consumptions of storage resources may be described in terms of number, size, and/or frequency of read and write operations to or from storage devices of nodes 115. Node properties 360 may include consumption parameters 402, such as ReadBytes 412, describing various sizes of such operations. Associated consumption values 404 may describe any suitable measure of storage consumptions, such as a size of such operations in a number of bytes to be read from and/or written to a storage device. Further, node properties 360 may describe effectuating a read and/or write operation one time or multiple times. Node properties 360 may contain parameters 402, such as ReadLoops 414, describing a number of times to effectuate such operations. Associated consumption values 404 may describe any suitable measure of numbers of times to repeat storage consumptions, such as a count of operations in an integral number of repetitions.

In some embodiments of the present disclosure, node properties 360 may describe consumption of processing resources of nodes 115. Synthetic application 130 may effectuate processing resource consumptions by causing nodes 115 to execute computer program instructions. Resource consumptions of processing resources of nodes 115 may be described in platform independent measurements of consumption, such as total processing power. Node properties 360 may include consumption parameters 402, such as CPUConsume 416, describing various sizes of such operations. In some embodiments, synthetic application modules 215 may be configured to generate computer executable program code, customized for a particular node 115, that consumes a platform-independent amount of resources.

In some embodiments, to consume an amount of processing resources of a node 115, synthetic application module 215 may generate program code to execute one or more loops of a set of computer-program instructions. Each loop may perform instances of a variety of typical processing resource consumptions, such as floating point calculations, Fibonacci calculations, sorting tasks, "card shuffling" tasks, data compression and decompression tasks, prime number calculations, sequence searching, or any other suitable type of processing resource consumption. Each type of processing resource consumption may have an associated weighting so that more, fewer, or equal processing resources are consumed for that type of processing resource consumption per loop as compared to other types. In some embodiments, weightings associated with types of processing resource consumptions may be the same for each node 115. In other embodiments, weightings associated with types of processing resource consumptions for different nodes 115 may be adjusted based on a hardware configuration of a particular node 115, an expected behavior of a real-world application, or any other suitable characteristic for adjusting weightings.

Node properties 360 may contain parameters 402, such as CPUConsume 416, describing an amount of processing resource to be consumed. Associated consumption values 404 may describe any suitable measure of processing resource consumptions. In some embodiments, associated consumption values 404 may describe a number of loops to be executed. In other embodiments, associated consumption values 404 may describe a period of time during which loops should be executed continuously. In further embodiments, associated consumption values 404 may describe a rate of loops to be executed per time period.

Node properties 360 may describe consumption of resources of network 120 connecting two or more nodes 115. For example, business functions 355 may specify instances of synthetic application 130 configured as parents to cause nodes 115 to transmit data via network 120 to one or more instances of synthetic application 130 configured as children. Node properties 360 may include consumption parameters 402, such as ReqSizes 418, describing various sizes of such transmitted data. Associated consumption values 404 may describe any suitable measure of sizes of data to be transmitted via network 120, such as numbers of bytes. Instances of synthetic application 130 configured as children may transmit replies to instances of synthetic application 130 configured as parents by transmitting data, as specified in business functions 355. Node properties 360 may include consumption parameters 402, such as ReplyBytes 420, describing various sizes of such transmitted data. Associated consumption values 404 may describe any suitable sizes of data to be transmitted via network 120, such as numbers of bytes. Although instances of synthetic application 130 configured as children or parents are described, network transmissions defined by node properties 360 may be performed between any suitable ones of nodes 115.

Node properties 360 may describe consumption of memory resources of nodes 115. Memory resources may be consumed by allocating blocks of memory of nodes 115. Upon receipt of an initiating event, synthetic application 130 may reserve a segment of memory of nodes 115. Node properties 360 may include consumption parameters 402, such as ReqMemBytes 422, describing various sizes of such segments. Associated consumption values 404 may describe any suitable measure of memory segments, such as sizes of such segments in numbers of bytes to be reserved in memory. Upon beginning execution of a business function, synthetic application 130 may also reserve a segment of memory of nodes 115. Node properties 360 may include consumption parameters 402, such as BFMemBytes 423, describing various sizes of such segments. Associated consumption values 404 may describe any suitable measure of memory segments, such as sizes of such segments in numbers of bytes to be reserved in memory. Synthetic application 130 may further reserve segments of memory independent of any initiating events. Node properties 360 may include consumption parameters 402, such as AppMemBytes 424, describing various sizes of such segments. Associated consumption values 404 may describe any suitable measure of memory segments, such as sizes of such segments in numbers of bytes to be reserved in memory.

Node properties 360 may specify a maximum number of requests to other instances of synthetic application 130 configured as children that may be concurrently outstanding. In some embodiments, numbers of concurrently pending requests may be monitored with reference to a population of tokens. For example, particular tokens may be reserved by synthetic application modules 215 for each request made instances of synthetic application 130 configured as a child. Upon receiving a reply, synthetic application modules 215 may release tokens corresponding to the original request. Node properties may include a parameter specifying a number of tokens, such as Tokens 426. Associated consumption values 404 may describe any suitable descriptions of token populations, such as strings, or numbers.

Real-world applications may consume resources in time varying magnitudes. For example, sizes of data transfers may vary between transfers. Likewise, size and frequencies of read and/or write operations to a storage device may vary between operations. Node properties 360 may describe resource consumptions in terms of distributions of resource consumptions, rather than a single value of a resource consumption. Where a value of a parameter of node properties 360 is referenced, it may be understood that a distribution of values may also be referenced. For example, values of parameters of node properties 360 may describe any suitable distribution of values, such as a uniform distribution, gamma distribution, Poisson distribution, a defined table, or a normal distribution.

Node properties 360 may also include parent node 428. Parent node 428 may include any suitable reference to a node 115 of system 100. Parent node 428 may have an associated address 430. After resource consumption of a node 115 are effectuated by an instance of synthetic application 130, synthetic application 130 may send a reply to parent node 428. A reply may be sent via network 120, for example, and may be addressed to parent node 428 by reference to address 430. Address 430 may include any suitable address for parent node 428, such as an internet protocol (IP) address.

Node properties 360 may also include one or more child flows 455. Child flows 455 may include information derived from business functions 355 of synthetic application definition 225. Child flows 455 may describe instances of synthetic applications 480 configured as children of an instance of synthetic application 130 to be configured according to node properties 360. Child flows 455 may include node properties 460 associated with instances of synthetic applications 480 configured as children. Child flows 455 may further describe one or more requests 482 to be made to child synthetic application 482 and one or more replies 483 to be made to back to an instance of synthetic application 130 to be configured according to node properties 360.

Figure 5:
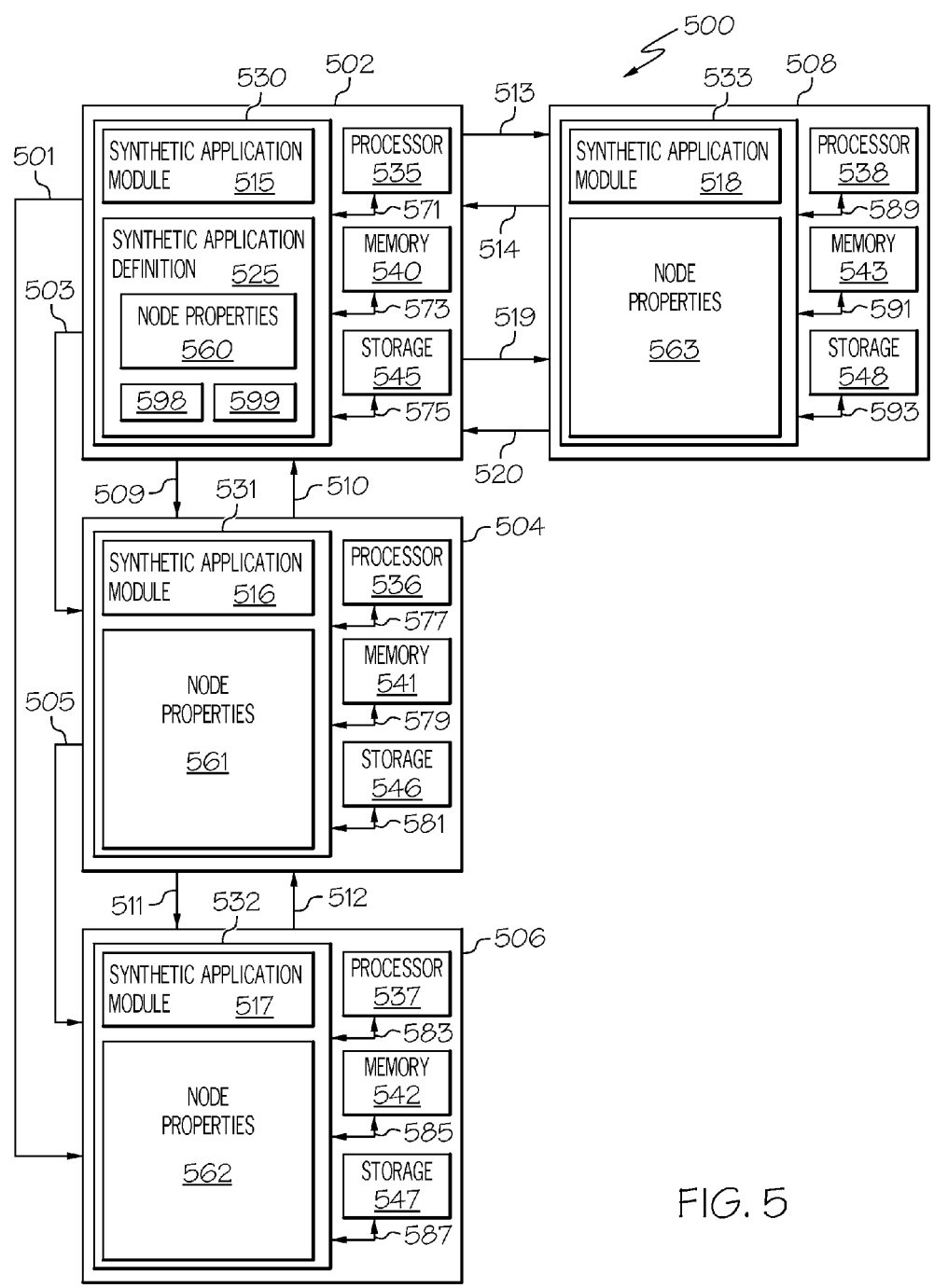
FIG. 5 is an illustration of the operation of a system for performing application-specific assessment of cloud hosting suitability, in accordance with the teachings of the present disclosure.

FIG. 5 is an illustration of the operation of system 500 for performing application-specific assessment of cloud hosting suitability, in accordance with the teachings of the present disclosure. System 500 may include nodes 502, 504, 506, and 508. Nodes 502, 504, 506, 508 may be implemented by any suitable node, such as those illustrated in FIG. 1. Although a particular number and arrangement of nodes is illustrated in FIG. 5, any suitable number, combination, arrangement, or topology of nodes may be used, such as a loop, ring, bus, star, point-to-point, mesh, or daisy-chain. Such topologies may be physical or virtual.

In some embodiments of the present disclosure, synthetic application 530 may be initiated by introducing synthetic application definition 525 to system 500. For example, synthetic application definition 525 may be introduced to system 500 by a file transfer protocol, hyper-text transfer protocol, manual loading from a universal serial bus (USB) storage device, or any other suitable means of introducing synthetic application definition 525 to system 500. In particular, synthetic application definition 525 may be introduced to one or more instances of synthetic applications within one or more nodes of system 500. An instance of a synthetic application to which a synthetic application definition is introduced may be referred to as a master instance. For example, synthetic application definition 525 may be introduced to synthetic application 530 in node 502. Thus, synthetic application 530 is a master instance. Master instances of synthetic applications may initiate resource consumptions autonomously based on workloads within synthetic application definitions, rather than initiating resource consumptions in response to an initiating event from a parent node.

Synthetic application modules may parse the components of synthetic application definitions. For example, synthetic application module 515 within node 502 may analyze a registry of synthetic application definition 525. Synthetic application module 515 may analyze a registry of synthetic application definition 525 by, for example, reading a list of instances of synthetic applications within the registry. Synthetic application module 515 may further analyze a registry of synthetic application definition 525 by, for example, reading a list of address of instances of synthetic applications within the registry and associating addresses with instances of synthetic applications.

Synthetic application modules may further parse synthetic application definitions by analyzing one or more business functions in synthetic application definition files. For example, synthetic application module 525 may analyze business functions in synthetic application definition 525. Analysis of business functions may include identifying instances of synthetic applications, described in business function, which will consume resources of various nodes of the system. By way of example, synthetic application definition 502 may include multiple business functions. For example, business function 598 might define node 504 as a child of node 502, and node 506 as a child of node 508. Business function 599 might define node 508 as a child of node 502, and node 502 as a child of node 508.

Instances of synthetic applications within nodes described by business functions may be identified. For example, synthetic application 530 may parse business function 598 and identify synthetic applications 531 and 532. Additionally, synthetic application 530 may parse business function 599 and identify synthetic applications 530 and 533.

Synthetic application modules may further parse synthetic application definitions by analyzing instances of node properties within business functions. Analysis of instances of node properties may include identifying parameters of node properties with no associated values. Values may be supplied for such parameters by reference to default parameters of synthetic application definition. For example, synthetic application module 515 may analyze node properties 560 of synthetic application definition 525.

After parsing synthetic application definitions, synthetic application modules may be configured to automatically transmit node properties to nodes identified by synthetic application module as included in business functions of synthetic application definition. Node properties may be transmitted via a network or any other suitable means. In one embodiment, based upon business function 598, synthetic application 530 may transmit node properties 561 to synthetic application 531 in node 504. Further, based upon business function 598, synthetic application 530 may transmit node properties 562 to synthetic application 532 in node 506, at 501. In another embodiment, based upon business function 598, synthetic application 530 may transmit node properties 561 to synthetic application 531 in node 504, at 503. Based upon business function 598, synthetic application 531 may transmit node properties 562 to synthetic application 532 in node 506, at 505. Likewise, based upon business function 599, synthetic application 530 may transmit node properties 563 to synthetic application 533 in node 508, at 507.

After synthetic application modules have distributed node properties to nodes described in business functions of synthetic application definitions, synthetic application modules may initiating resource consumptions based upon workloads of synthetic application definitions. For example, based upon business function 598, synthetic application 530 may consume resources of node 502 based upon a workload in synthetic application definition 525. For example, based upon parameters in node properties file 560, synthetic application 530 may: send instructions 571 to processor 535 to consume processing resources; send instructions 573 to memory 540 to consume memory resources; and send instructions 575 to consume storage resources 545. After resource consumptions of node 502 are complete, synthetic application 530 in node 502 may initiate a request 509 to synthetic application module 531 in node 504. Request 509 may include any suitable request, such as a data transfer via a network. Upon receipt of request 509, synthetic application 531 may consume resources of node 504. For example, based upon parameters in node properties file 561, synthetic application 531 may: send instructions 577 to processor 536 to consume processing resources; send instructions 579 to memory 541 to consume memory resources; and send instructions 581 to consume storage resources 547. After resource consumptions of node 504 are complete, synthetic application 531 may send one or more requests 511 to synthetic application 532 in node 506 as described in business function 598.

Request 511 may be any suitable request, such as a data transfer via a network. Upon receipt of request 511, synthetic application 532 may consume resources of node 506. For example, based upon parameters in node properties file 562, synthetic application 532 may: send instructions 583 to processor 537 to consume processing resources; send instructions 585 to memory 542 to consume memory resources; and send instructions 587 to consume storage resources 547. After resource consumptions of node 506 are complete, synthetic application 532 may send one or more replies 512 to synthetic application 531 in node 504 as described in business function 598. Upon receipt of reply 512, synthetic application 531 may send one or more replies 510 to synthetic application 530 in node 502 as described in business function 598. Upon receipt of replies 510, one iteration of exemplary business function 598 may be complete. Synthetic application 515 may be configured to measure a time duration between initiating resource consumption of node 502 and receipt of reply 520. Time durations between requests and replies may be stored in storage associated with synthetic application 530.

Based upon business function 599, synthetic application 530 may again consume resources of node 502 based upon a workload in synthetic application definition 525. For example, based upon parameters in node properties file 560, synthetic application 530 may: send instructions 571 to processor 535 to consume processing resources; send instructions 573 to memory 540 to consume memory resources; and send instructions 575 to consume storage resources 545. After resource consumptions of node 502 are complete, synthetic application 530 in node 502 may initiate a request 513 to synthetic application module 533 in node 508. Request 513 may be any suitable request, such as a data transfer via a network. Upon receipt of request 513, synthetic application 533 may consume resources of node 508. For example, based upon parameters in node properties file 563, synthetic application 533 may: send instructions 589 to processor 538 to consume processing resources; send instructions 591 to memory 54 to consume memory resources; and send instructions 593 to consume storage resources 548. After resource consumptions of node 508 are complete, synthetic application 533 may send one or more requests 514 to synthetic application 530 in node 502 as described in business function 599.

Request 513 may be any suitable request, such as a data transfer via a network. Upon receipt of request 513, synthetic application 530 may consume resources of node 502. For example, based upon parameters in node properties file 560, synthetic application 530 may: send instructions 571 to processor 535 to consume processing resources; send instructions 573 to memory 540 to consume memory resources; and send instructions 575 to consume storage resources 545. After resource consumptions of node 502 are complete, synthetic application 530 may send one or more replies 519 to synthetic application 533 in node 506 as described in business function 599. Upon receipt of replies 519, synthetic application 533 may send one or more replies 520 to synthetic application 530 in node 502 as described in business function 599. Upon receipt of replies 520, one iteration of exemplary business function 599 may be complete. Synthetic application 515 may be configured to measure a time duration between initiating resource consumption of node 502 receipt of replies 520. Time durations between requests and replies may be stored in storage associated with synthetic application 530.

Figure 6:
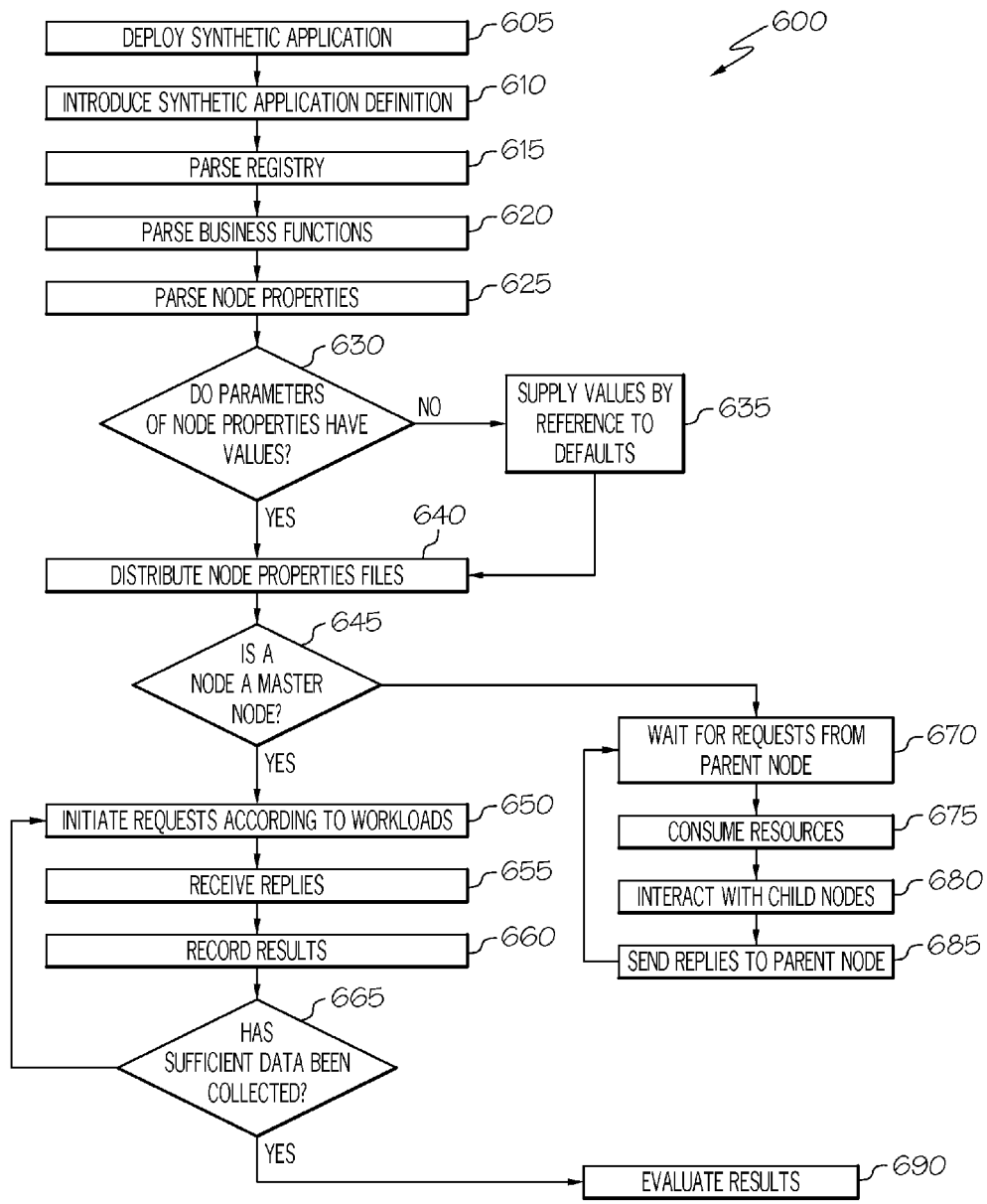
FIG. 6 is a flowchart of an exemplary method for performing application-specific assessment of cloud hosting suitability, in accordance with the teachings of the present disclosure.

FIG. 6 is a flowchart of an exemplary method 600 for performing application-specific assessment of cloud hosting suitability, in accordance with the teachings of the present disclosure. Although FIG. 6 discloses a particular number of steps to be taken with respect to exemplary method 600, method 600 may be executed with more or fewer steps than those depicted in FIG. 6. In addition, although FIG. 6 discloses a certain order of steps to be taken with respect to method 600, the steps of these methods may be completed in any suitable order. Method 600 may be implemented using the system of FIGS. 1-5, 7, 9, 11, 13, or any other suitable mechanism. In certain embodiments, method 600 may be implemented partially or fully in software embodied in computer-readable storage media.

Program instructions may be used to cause a general-purpose or special-purpose processing system that is programmed with the instructions to perform the operations described below. The operations may be performed by specific hardware components that contain hardwired logic for performing the operations, or by any combination of programmed computer components and custom hardware components. Method 600 may be provided as a computer program product that may include one or more machine readable media having stored thereon instructions that may be used to program a processing system or other electronic device to perform the methods.

In some embodiments, method 600 may begin at step 605. At step 605, a synthetic application may be deployed to various nodes of a computing system, for example computing system 100 of FIG. 1, or system 500 of FIG. 5. Nodes may include, for example, a server (e.g., blade server or rack server), personal computer (e.g., desktop or laptop), tablet computer, mobile device (e.g., personal digital assistant (PDA) or smart phone), network storage device, printer, switch, router, data collection device, virtual machine, script, executable, firmware, library, shared library, function, module, software application, or any other suitable device or application. Synthetic applications may be deployed to nodes by use of a network or any other suitable means of deploying synthetic applications.

At step 610, synthetic application definitions may be introduced to one or more synthetic applications of nodes of a computing system, for example synthetic application definition 225 of FIG. 3. Synthetic application definitions may be distributed to nodes by use of a network or any other suitable means of deploying synthetic application definition. An instance of synthetic application to which a synthetic application definition is distributed may be referred to as a master instance of synthetic application.

At step 615, synthetic application modules of a synthetic application may parse a registry of a synthetic application definition, for example, registry 305 of FIG. 3. A registry may include listings of nodes described in synthetic application definition. A registry may further include addresses of corresponding to nodes described in a registry. Addresses may include, for example, internet protocol addresses, or any other suitable type of address.

At step 620, synthetic application modules of a synthetic application may parse business functions of a synthetic application definition, for example, business functions 355A and 355B of FIG. 3. Parsing business functions of synthetic application definitions may include identifying other instances of synthetic applications described in business functions. For example, as shown in FIG. 3, synthetic application module may identify instances of synthetic applications such as 380A, 380B, 380C, 380D and/or 380E.

At step 625, synthetic application modules may parse node properties of synthetic application definition, for example node properties 360 of FIG. 4. Parsing node properties may include reading child flows of node properties, for example, child flows 455A of FIG. 4. Parsing node properties may further include identifying a parent node, such as parent node 428 of FIG. 4, and an associated address, such as address 430 of FIG. 4.

At step 630, synthetic application modules may determine whether node properties have values associated with parameters of node properties, for example values 404 of parameters 402 as show in FIG. 4. If one or more instances of node properties do not have values associated with parameters, at step 635, synthetic application modules may refer to default parameters, such as default parameters 365 of FIG. 3, to supply parameter values. The method may proceed to step 640.

After node properties have values for parameters, at step 640, synthetic application modules may distribute node properties to other instances of synthetic application modules. For example, node properties may be distributed to one or more instances of synthetic application described in child flows of node properties. Node properties may be distributed to instances of synthetic applications via a network or any other suitable means of distribution.

At step 645, if a synthetic application is configured as a master instance, the method may proceed to step 650. If a synthetic application is not configured as a master instance, the method may proceed to step 670.

At step 650, a synthetic application configured as a master instance may initiate resources consumptions based upon one or more workloads. For example, synthetic application modules may commence consuming resources of a computing system. Consumption of resources may begin, for example, by one or more master instances of synthetic application issuing resource consumption requests according to workloads in synthetic applications definitions. Issuing consumption requests may also include beginning data collection of time durations between requests and replies.

At step 655, instances of synthetic applications configured as master instances may wait for replies from instances of synthetic application configured as children. For example, replies may include a transmission of data over a network from an instance of a synthetic application configured as a child. Replies from instances of synthetic applications configured as children may be sent after those instances have completed resource consumptions, such as in step 685.

At step 660, an instance of a synthetic application configured as a master instance may record results. Recording results may include, for example, recording time durations between issuing requests and receiving replies. Results may be stored in a storage resource of a node associated with an instance of a synthetic application, or any other suitable storage resource.

At step 665, synthetic application modules may determine whether sufficient results have been collected. Such a determination may be based upon statistical analysis, other industry best practices, or any other suitable method. If sufficient results have been collected, the method may proceed to step 690. Otherwise, the method may return to step 650.

If, at step 645, an instance of a synthetic application is not configured as a master instance, the method may proceed to step 670. At step 670, an instance of a synthetic application may wait for a request from a parent node, such as a request from step 650, or a request from step 680. Upon receipt of such a request, the method may proceed to step 675.

At step 675, instances of synthetic application modules may consume resources of nodes of a computing system. For example, synthetic application modules may consume processing resources, storage resources, memory resources, network resources, and/or any other suitable resource associated with nodes of a computing system. Resource consumption may be effectuated based upon parameters included in node properties.

At step 680, instances of synthetic applications may interact with other instances of synthetic applications configured as children. Interactions may include sending requests, wait for replies, receiving replies or recording results.

At step 685, instances of synthetic applications configured as children may send replies to instances of synthetic applications configured as parents. Replies may include transmissions of data to a parent node over a network. Replies may also include recorded result data from interactions with child nodes.

At step 690, results may be evaluated. For example, time duration data corresponding to instances of synthetic applications may be compared to threshold performance requirements. Any suitable method of evaluating time duration data may be used. Method 600 may repeat with different synthetic applications or different synthetic application definitions, or may terminate.

Figure 7A:
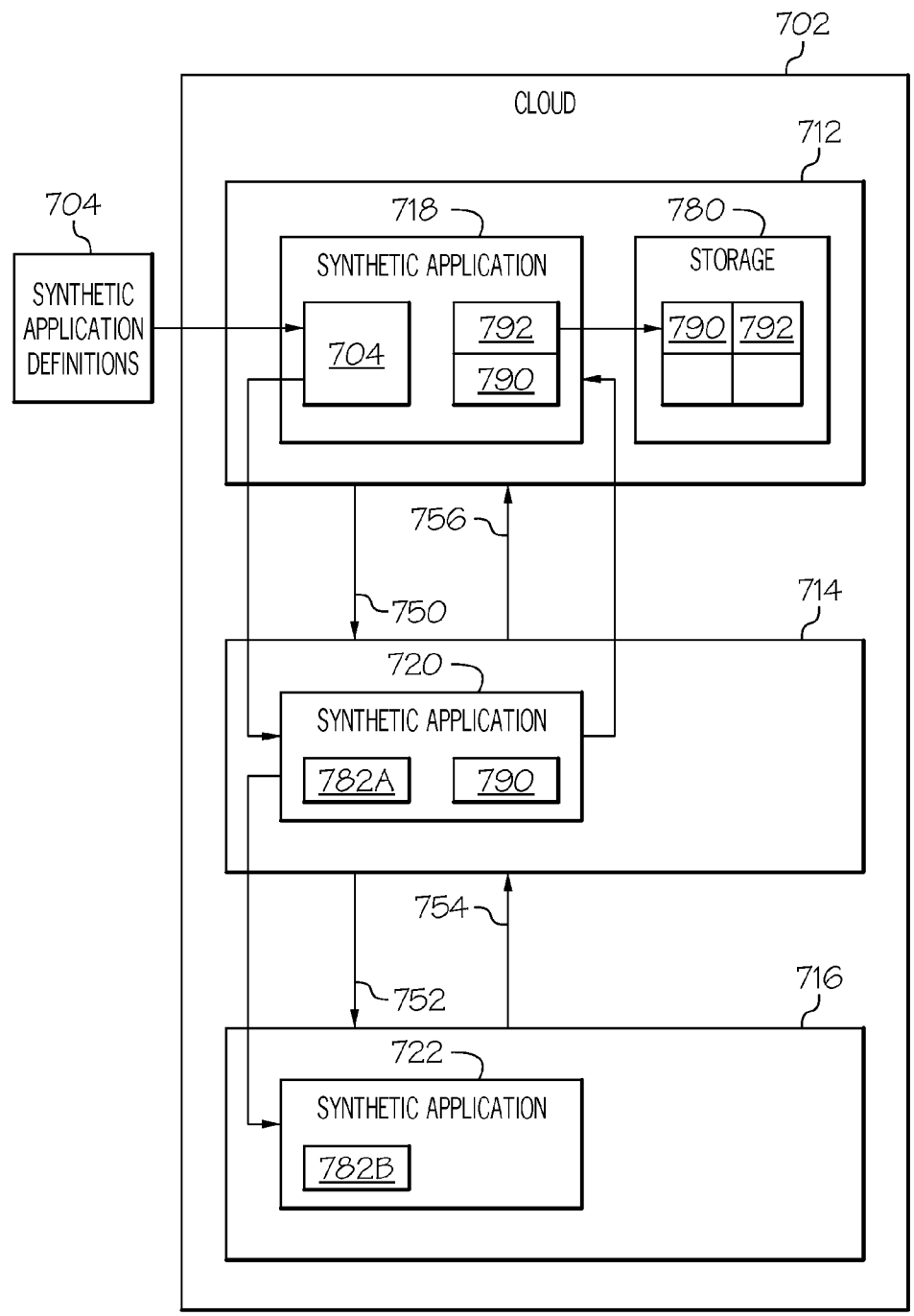
FIGS. 7A and 7B are illustrations of an exemplary system for performing application-specific assessment of cloud hosting suitability for multiple applications, in accordance with teachings of the present disclosure.
Figure 7B:
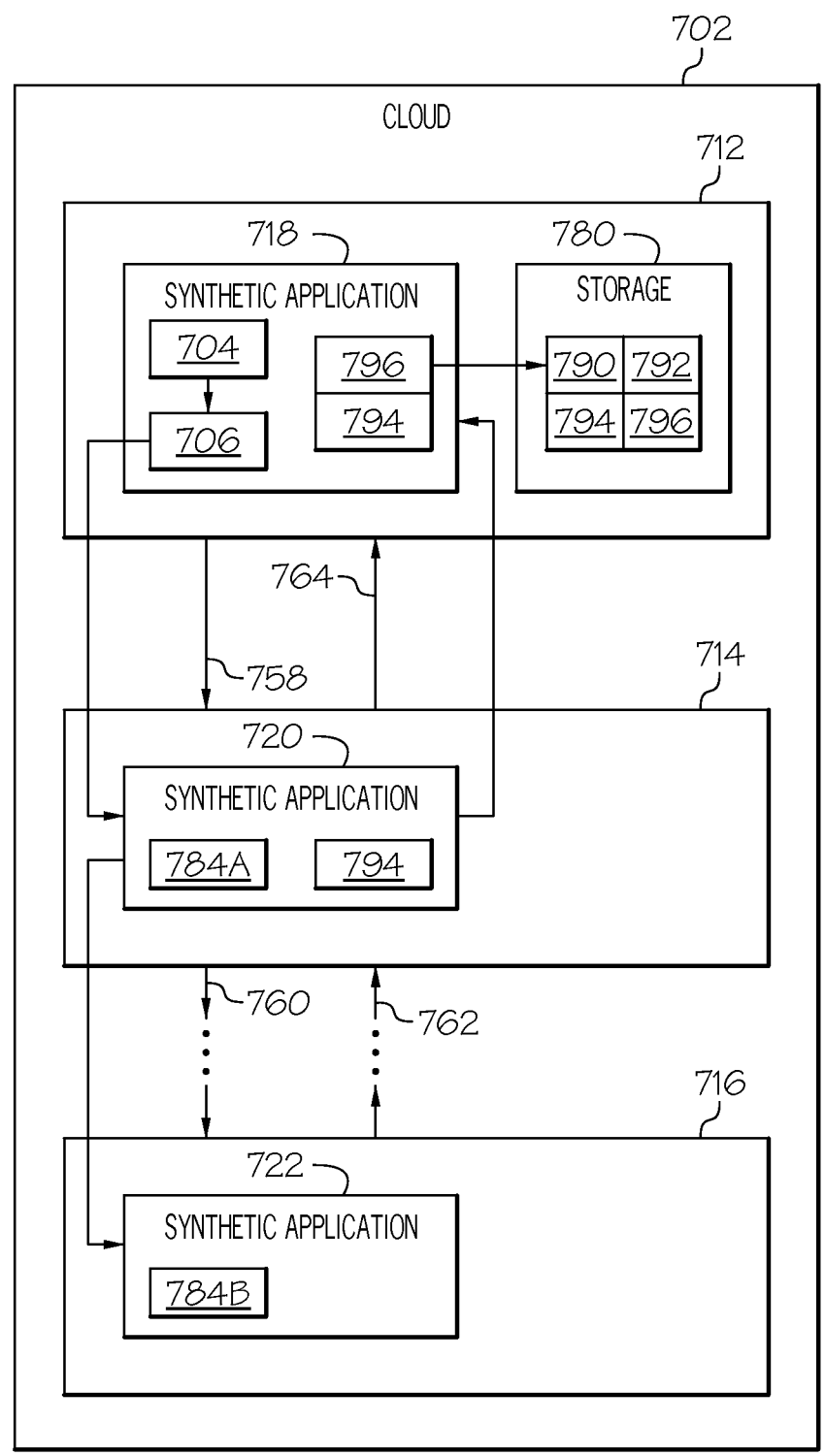

FIGS. 7A and 7B are illustrations of an exemplary system 700 for performing application-specific assessment of cloud hosting suitability for multiple applications, in accordance with teachings of the present disclosure. System 700, as shown in FIGS. 7A and 7B, may include instances of synthetic applications configured to consume resources of nodes of system 700 based on multiple synthetic application definitions. For example, system 700 may be configured to effectuate multiple resource consumptions of nodes in cloud 702. Cloud 702 may include nodes 712, 714, and 716. Nodes 712, 714, and 716 may include synthetic applications 718, 720, and 722, respectively.

In some embodiments, synthetic applications may be configured to effectuate resource consumptions based upon two or more related instances of synthetic application definitions. For example, an instance of a synthetic application definition may describe resource consumptions of a particular real-world application based upon a particular level of user demand. However, an operator of such a real-world application may predict that level of user demand may change. Thus, an additional instance of synthetic application definition may be created, wherein the additional synthetic application definition describes predicted resource consumptions of a real-world application based upon a different level of user demand.

Additional instances of synthetic application definitions may be created by modifying one or more values associated with resource consumptions in a first synthetic application definition. For example, an additional instance of a synthetic application definition may be created from a first synthetic application by any suitable means, including but not limited to: multiplying one or more values by a scaling factor, adding an offset to one or more values, altering the mix of business functions altering business functions, altering workloads, or alerting node properties.

In one embodiment, synthetic applications 718, 720, 722 may be configured to illustrate whether cloud 702 may accommodate increased changes in application footprint in resource consumption. In another embodiment, synthetic applications 718, 720, 722 may be configured to determine whether resources, uptime, or availability of cloud 702 may be reduced while still meeting performance goals. In yet another embodiment, synthetic applications 718, 720, 722 may be configured to determine whether cloud 702 may increase resources of existing nodes 712, 714, 716 or add further nodes to meet performance goals.

Evaluation of increased changes in application footprint in resource consumption, performance goals, or other execution metrics of cloud 702 may be performed in any suitable manner. In one embodiment, evaluation of execution may be made by measuring response time for a given business function or other operation to be executed by synthetic applications 718, 720, 722. Response time may include time required to propagate information between synthetic applications 718, 720, 722 as well as time required for each synthetic application 718, 720, 722 to perform specified tasks.

As shown in FIG. 7A, synthetic application definition 704 may be introduced to synthetic application 718. Synthetic application 718 may parse synthetic application definition 704. Synthetic application 718 may distribute node properties 782A and 782B to synthetic application 720 in node 714, and synthetic application 722 in node 716, respectively. Once nodes described in business functions of synthetic application definition 704 have node properties 782, synthetic application 718 may send one or more requests 750 to synthetic application 720. Synthetic application 718 may begin measuring time durations for instances of requests 750. Responsive to such requests, synthetic application 720 may initiate resource consumptions of node 714. Based upon business functions in synthetic application definition 704, synthetic application 720 may send one or more requests 752 to synthetic application 722. Synthetic application 720 may begin measuring time durations for instances of requests 752. Responsive to such requests, synthetic application 722 may initiate resource consumptions of node 716. After completing resource consumptions of node 716, synthetic application 722 may send replies 754 to synthetic application 720. Synthetic application 720 may finish measuring time durations for each request 752 based upon replies 754. Synthetic application 720 may send replies 756 to synthetic application 718. Synthetic application 718 may finish measuring time durations for each request 750 based upon replies 756. Synthetic application 720, may send time duration data 790 measured by synthetic application 720 to synthetic application 718. Synthetic application 718 may store time duration data 790 and 792 measured by synthetic applications 720 and 718 in storage 780 or memory of node 712.

As shown in FIG. 7B, synthetic application 718 may be configured to generate additional instances of synthetic application definitions based upon any suitable expected change in real-world application behavior. For example, synthetic application 718 may be configured to generate synthetic application definition 706 based upon synthetic application 704. Synthetic application 718 may generate synthetic application definition 706 by modifying any suitable portion of synthetic application definition 704, such as workloads, business functions, or registries.

In one embodiment, synthetic application definition 706 may include modified business functions. If, for example, particular groups of nodes designated for hosting portions of real-world applications are expected to see increased, decreased or changed levels of user-demand, business functions of synthetic application 706 representing these portions may be modified to include more, fewer, or different nodes. Synthetic application definition 706 may further include a modified registry including lists of additional or different nodes and addresses corresponding to those nodes. Additionally, synthetic application definition 706 may include a modified Mix of business functions, and/or modified mix parameters or associated mix values.

In another embodiment, synthetic application definition 706 may include modified workloads. For example, values associated with parameters such as WorkloadIterations, WorkloadDelay, WorkloadReqSize, WorkloadConcurrency, WorkloadKind may be modified to reflect an expected behavior of a real-world application at a different level of user demand. In yet another embodiment, node properties included in synthetic application definition 704 may be modified. For example values associated with parameters such as ThreadLimit, FanOuts, SerialExecution, ReadBytes, ReadLoops, CPUConsume, ReqSizes, ReplyBytes, ReqMemBytes, AppMemBytes, or Tokens may be modified to reflect an expected behavior of a real-world application at a different level of user demand After generating synthetic application definition 706, synthetic application 718 may parse synthetic application definition 706. Synthetic application 718 may distribute node 784A and 784B properties to synthetic application 720 in node 714, and synthetic application 722 in node 716, respectively. Although a particular number and configuration of nodes of cloud 702 is shown in FIG. 7B, it will be understood that more, fewer or different nodes may be included in synthetic application definition 706. Based upon synthetic application definition 706, instances of synthetic applications may consume resources of any suitable node.

Once nodes described in business functions of synthetic application definition 704 have node properties, synthetic application 718 may send one or more requests 758 to synthetic application 720. Synthetic application 718 may begin measuring time durations 796 for instances of requests 758. Responsive to such requests, synthetic application 720 may initiate resource consumptions of node 714. Based upon business functions in synthetic application definition 704, synthetic application 720 may send one or more requests 760. In one embodiment, requests 760 may be sent via a network to synthetic application 722. In another embodiment, if business functions of synthetic application definition 706 are different from business functions of synthetic application definition 704, requests 760 may be sent to any specified synthetic application in any suitable node. Synthetic application 720 may begin measuring time durations 794 for instances of requests 752.

Responsive to such requests, synthetic application 722 may initiate resource consumptions of node 716. After completing resource consumptions of node 716, synthetic application 722 may send replies 762. In one embodiment, replies 762 may be sent via a network to synthetic application 720. In another embodiment, if business functions of synthetic application definition 706 are different from business functions of synthetic application definition 704, replies 762 may be sent to any specified synthetic application in any suitable node. Synthetic application 720 may finish measuring time durations 794 for each request 760 based upon replies 762. Synthetic application 720 may send replies 764 to synthetic application 718. Synthetic application 718 may finish measuring time durations 796 for each request 758 based upon replies 764. Synthetic application 720 may send time duration data 794 measured by synthetic application 720 to synthetic application 718. Synthetic application 718 may store time duration data 794 and 796 measured by synthetic applications 720 and 718 in storage 780 or memory of node 712.

Although a particular number and configuration of nodes is depicted in FIG. 7B, it will be understood that synthetic application 718 may consume resources of any suitable node in response to synthetic application definition 706. It will also be understood that differences between business functions depicted in FIGS. 7A and 7B are exemplary, and that any suitable modifications may be made to a synthetic application definition. Further, although synthetic application 718 is described as generating synthetic application definition 706, it will be understood that any suitable node or portion of node, whether included in cloud 702 or not, may be used to generate synthetic application definition 706.

Using time duration data measured from resource consumptions effectuated based on synthetic application definitions 704 and 706, performance characteristics of a real-world application at multiple levels of user demand may be evaluated. For example, time durations derived from synthetic application definitions 706 may be compared to time durations derived from synthetic application definitions 704 to estimate changes in performance. Time durations derived from synthetic application definitions 706 may be compared to a threshold performance requirement. Comparisons may be implemented using processing, memory, or storage resources of any suitable node. For example, one or more nodes in system 700 may include computer program code for comparing time durations data 790 or 792 to time duration data 794 or 796. In other embodiments, one or more nodes in system 700 may include computer program code for comparing time durations data 790, 792, 794 or 796 to threshold time duration values.

Based on time durations data 790, 792, 794 or 796, system 700 may evaluate whether changes reflected in synthetic application definitions 706 are acceptable. For example, differences between time durations data 790, 792, 794 or 796 may be compared to thresholds establishing whether changes in response time represent suitable performance changes. If such changes in response time represent suitable performance changes, then real applications represented by synthetic application definitions 706 may be used on cloud 702.

System 700 may consume any suitable analysis of time durations data 790, 792, 794 or 796 to launch the operation of real-world applications upon which synthetic application definitions 704, 706 are based. For example, if the footprint of a real-world application needs to increase, as represented by changes in requirements of synthetic application definition 706 over synthetic application definition 704, system 700 may analyze resulting time durations data 790, 792, 794 or 796. If such data indicates that operation based upon synthetic application definition 706 meets performance thresholds, then system 700 may launch a real-world application on cloud 702 with a footprint matching that in synthetic application definition 706.

Figure 8:
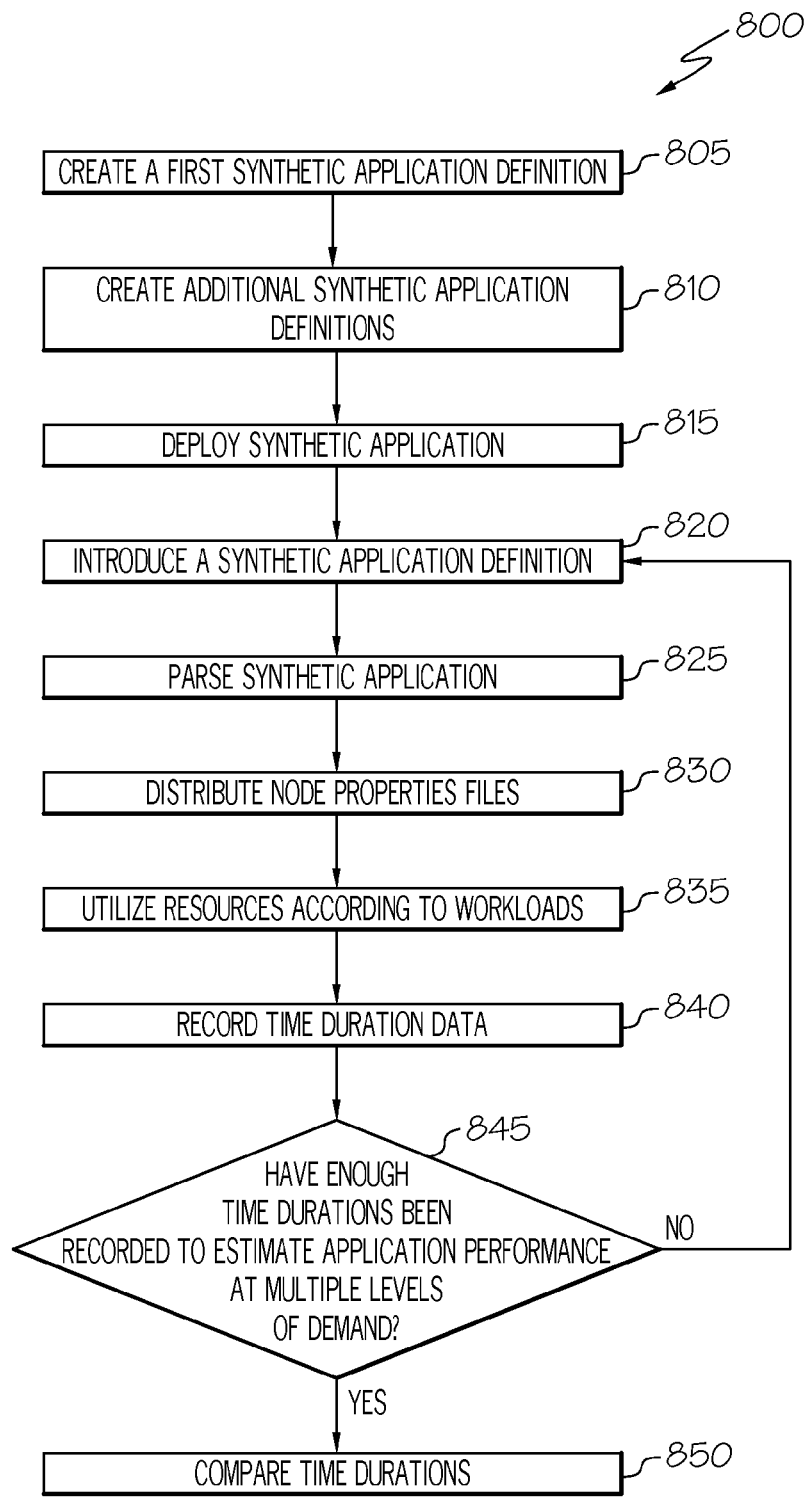
FIG. 8 is a flowchart of an exemplary method for performing application-specific assessment of cloud hosting suitability for multiple applications, in accordance with teachings of the present disclosure.

FIG. 8 is a flowchart of an exemplary method 800 for performing application-specific assessment of cloud hosting suitability for multiple applications, in accordance with teachings of the present disclosure. Although FIG. 8 discloses a particular number of steps to be taken with respect to exemplary method 800, method 800 may be executed with more or fewer steps than those depicted in FIG. 8. In addition, although FIG. 8 discloses a certain order of steps to be taken with respect to method 800, the steps of these methods may be completed in any suitable order. Method 800 may be implemented using the system of FIGS. 1-5, 7, 9, 11, 13, or any other suitable mechanism. In certain embodiments, method 800 may be implemented partially or fully in software embodied in computer-readable storage media. Method 800 may be provided as a computer program product that may include one or more machine readable media having stored thereon instructions that may be used to program a processing system or other electronic device to perform the methods.

Method 800 may begin, for example, at step 805 with the creation of a synthetic application definition. The synthetic application definition may describe sequences of resource consumptions which approximate the behavior of a particular real-world application or group of applications.

At step 810, additional synthetic applications may be created based upon any suitable expected change in application behavior, such as an increase, decrease, or change in user demand. For example, additional synthetic applications may be scaled by increasing, decreasing, and/or modifying any suitable parameter of a synthetic application, such as workloads, business functions, registries, or default parameters.

At step 815, synthetic applications may be deployed to various nodes of a computing system, for example computing system 700 of FIGS. 7A and 7B. Nodes may include, for example, a server (e.g., blade server or rack server), personal computer (e.g., desktop or laptop), tablet computer, mobile device (e.g., personal digital assistant (PDA) or smart phone), network storage device, printer, switch, router, data collection device, virtual machine, script, executable, firmware, library, shared library, function, module, software application, or any other suitable device or application. Synthetic applications may be deployed to nodes by use of a network or any other suitable means of deploying synthetic applications.

At step 820, synthetic application definitions may be introduced to one or more synthetic applications of nodes of a computing system, for example synthetic application definition 704 or 706 of FIGS. 7A and 7B respectively. Synthetic application definitions may be distributed to nodes by use of a network or any other suitable means of deploying synthetic application definition. An instance of synthetic application to which a synthetic application definition is distributed may be referred to as a master instance of synthetic application.

At step 825, synthetic application modules of a synthetic application may parse a synthetic application definition. Parsing a synthetic application definition may include parsing a registry, parsing business functions, parsing node properties, or referring to default parameters to supply parameter values, as shown, for example, in FIGS. 1, 5, 6, and 7.

At step 830, synthetic application modules may distribute node properties to other instances of synthetic application modules. For example, node properties may be distributed to one or more instances of synthetic application described in child flows of node properties. Node properties may be distributed to instances of synthetic applications via a network or any other suitable means of distribution.

At step 835, synthetic application modules may commence consuming resources of a computing system. Instances of synthetic application modules may consume resources of nodes of a computing system. For example, synthetic application modules may consume processing resources, storage resources, memory resources, network resources, and/or any other suitable resource associated with nodes of a computing system. Resource consumption may be effectuated based upon parameters included in node properties. Consumption of resources may begin, for example, by one or more master instances of synthetic application issuing resource consumption requests according to workloads in synthetic applications definitions. Issuing consumption requests may also include beginning data collection of time durations between requests and replies.

At step 840, after completing resource consumptions of nodes of a computing system, synthetic application modules may send replies to parent instances of synthetic application modules. Receipt of replies may initiate recording of time duration data between requests and replies. Time duration data may be stored in a storage resource of a node, as shown in FIG. 7.

At step 845, if sufficient time duration data to compare performance of applications in a particular cloud at varying demand levels is available, the method may proceed to step 850. If sufficient data is not available, the method may return to step 820, where a new synthetic application definition may be deployed. Sufficient data may be available when multiple versions of a synthetic application definition have been used to generate time duration data. Any suitable number of synthetic applications may be used.

At step 850, time duration data corresponding to instances of synthetic application definitions may be evaluated. For example, time duration data corresponding to one synthetic application may be compared to time duration data corresponding to a different synthetic application. In other embodiments, time duration data corresponding to a synthetic application may be compared to threshold performance requirements. Any suitable method of evaluating time duration data may be used. Method 800 may repeat with different synthetic applications, or different synthetic application definitions, or may terminate.

Figure 9:
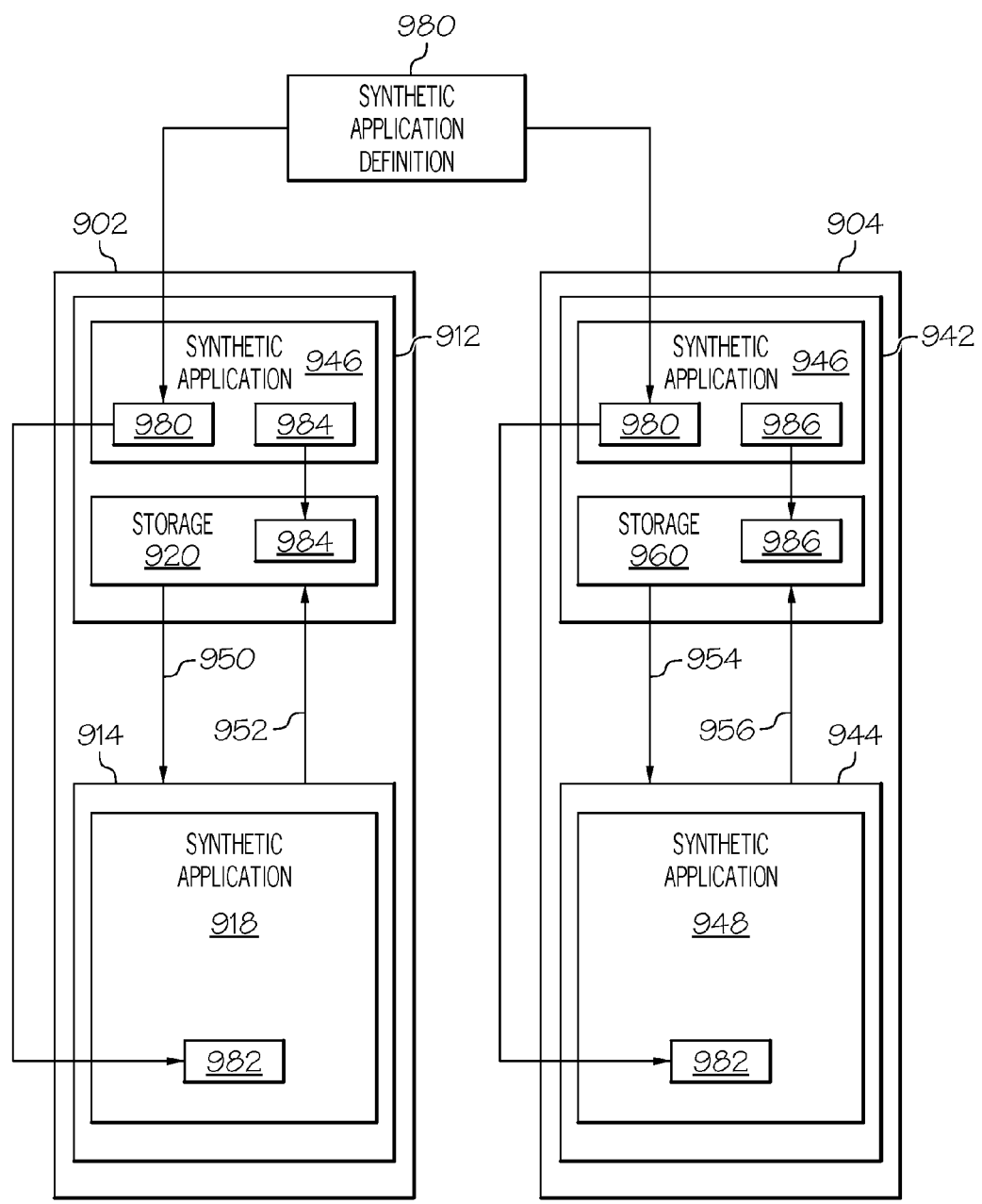
FIG. 9 is an illustration of an exemplary system for performing application-specific assessment of cloud hosting suitability of multiple clouds, in accordance with teachings of the present disclosure.

FIG. 9 is an illustration of an exemplary system 900 for performing application-specific assessment of cloud hosting suitability of multiple clouds, in accordance with teachings of the present disclosure. System 900, as shown in FIG. 9, may include clouds 902 and 904. In some embodiments, system 900 may be configured to effectuate resource consumptions of nodes in clouds 902 and 904. Cloud 902 may include nodes 912 and 914. Nodes 912 and 914 may include synthetic applications 916 and 918 respectively. Cloud 904 may include nodes 942, and 944. Nodes 942 and 944 may include synthetic applications 946 and 948 respectively. In some embodiments, synthetic application definition 980 may be generated by modifying a base synthetic application definition to reflect a new expected level of user demand. In other embodiments, synthetic application definition 980 may be chosen to represent any suitable real-world application behavior.

In some embodiments of the invention, synthetic applications may be configured to estimate the performance of a real-world application in more than one cloud. A particular cloud hosting a real-world application may be unsuitable or less suitable than another cloud for a variety of reasons. For example, if a third-party is purchasing infrastructure as a service and user demand drops, an application may be moved to another cloud to save infrastructure costs. If user demand increases, an application may be moved to another cloud provisioned with greater resources to maintain sufficient response times. For any suitable reason, it may be desirable to estimate the performance of a real-world application on more than one cloud by using synthetic applications. Synthetic applications in different clouds may be configured based on a synthetic application definition describing resource consumptions of a particular real-world application.

Evaluation of performance goals or other execution metrics of clouds 902 or 904 may be performed in any suitable manner. In one embodiment, evaluation of execution may be made by measuring response times for given business functions or other operations to be executed by synthetic applications 916 or 918 in cloud 902, or synthetic applications 946 or 948 in cloud 904. Response times may include time required to propagate information between synthetic applications 916, 918 or 946, 948 as well as time required for each synthetic application 916, 918, 946, 948 to perform specified tasks.

Synthetic application definition 980 may be introduced to synthetic application 916 in node 912. Synthetic application 916 may parse synthetic application definition 980. Synthetic application 916 may distribute node properties 982 to synthetic application 918 in node 914. Once nodes described in business functions of synthetic application definition 980 have node properties, synthetic application 912 may, based upon business functions in synthetic application definition 980, send one or more requests 950 to synthetic application 918. Synthetic application 912 may begin measuring time durations 984 for instances of requests 950. Responsive to such requests, synthetic application 918 may initiate resource consumptions of node 914. After completing resource consumptions, synthetic application 918 may send replies 952 to synthetic application 916. Synthetic application 916 may finish measuring time durations 984 for each request 950 based upon replies 952. Synthetic application 916 may store time duration data 984 measured by synthetic application 916 in storage or memory of node 912.

Synthetic application definition 980 may be introduced to synthetic application 946 in node 942. Synthetic application 946 may parse synthetic application definition 980. Synthetic application 946 may distribute node properties 982 to synthetic application 948 in node 944. Once nodes described in business functions of synthetic application definition 980 have node properties, synthetic application 942 may, based upon business functions in synthetic application definition 980, send one or more requests 954 to synthetic application 948. Synthetic application 942 may begin measuring time durations 986 for instances of requests 954. Responsive to such requests, synthetic application 948 may initiate resource consumptions of node 944. After completing resource consumptions, synthetic application 948 may send replies 956 to synthetic application 946. Synthetic application 946 may finish measuring time durations 986 for each request 954 based upon replies 956. Synthetic application 946 may store time duration data 986 measured by synthetic application 946 in storage 960 or memory of node 942.

Using time duration data 984 and 986 measured from resource consumptions effectuated based on synthetic application definitions 980 in clouds 902 and 904, performance characteristics of a real-world application in multiple cloud may be evaluated. For example, time durations 984 derived from synthetic application definitions 980 in cloud 902 may be compared to time durations 986 derived from synthetic application definitions 980 in cloud 904 to estimate differences in performance. Time durations 984 and 986 derived from synthetic application definitions 980 may be compared to threshold performance requirements. Comparisons may be implemented using processing, memory, network, or storage resources of any suitable node. For example, one or more nodes in system 900 may include computer program code for comparing time duration data 984 to time duration data 986. In other embodiments, one or more nodes in system 900 may include computer program code for comparing time durations data 984 or 986 to threshold time duration values.

Based upon comparisons of time durations 984, 986 with threshold performance requirements, system 900 may deploy a real-world application to a selected one of clouds 902, 904. Furthermore, based upon such comparisons, system 900 may move a real-world application from cloud 902 to cloud 904, or vice-versa. The real-world application may include an application upon which synthetic application definitions 980 is based.

In one embodiment, if cost of operation of cloud 902 is greater than cloud 904, and synthetic applications in cloud 904 operate within performance thresholds, system 900 may launch the real-world application in cloud 904. In another embodiment, if synthetic applications in cloud 902 do not meet performance thresholds but the same synthetic application in cloud 904 meets performance threshold, system 900 may launch the real-world application in cloud 904. In yet another embodiment, clouds 902, 904 are both available to execute a real-world application, system 900 may launch the real-world application in the one of clouds 902, 904 that has the best performance of the same synthetic application. Such a best performance may be rated by, for example, response times.

Figure 10:
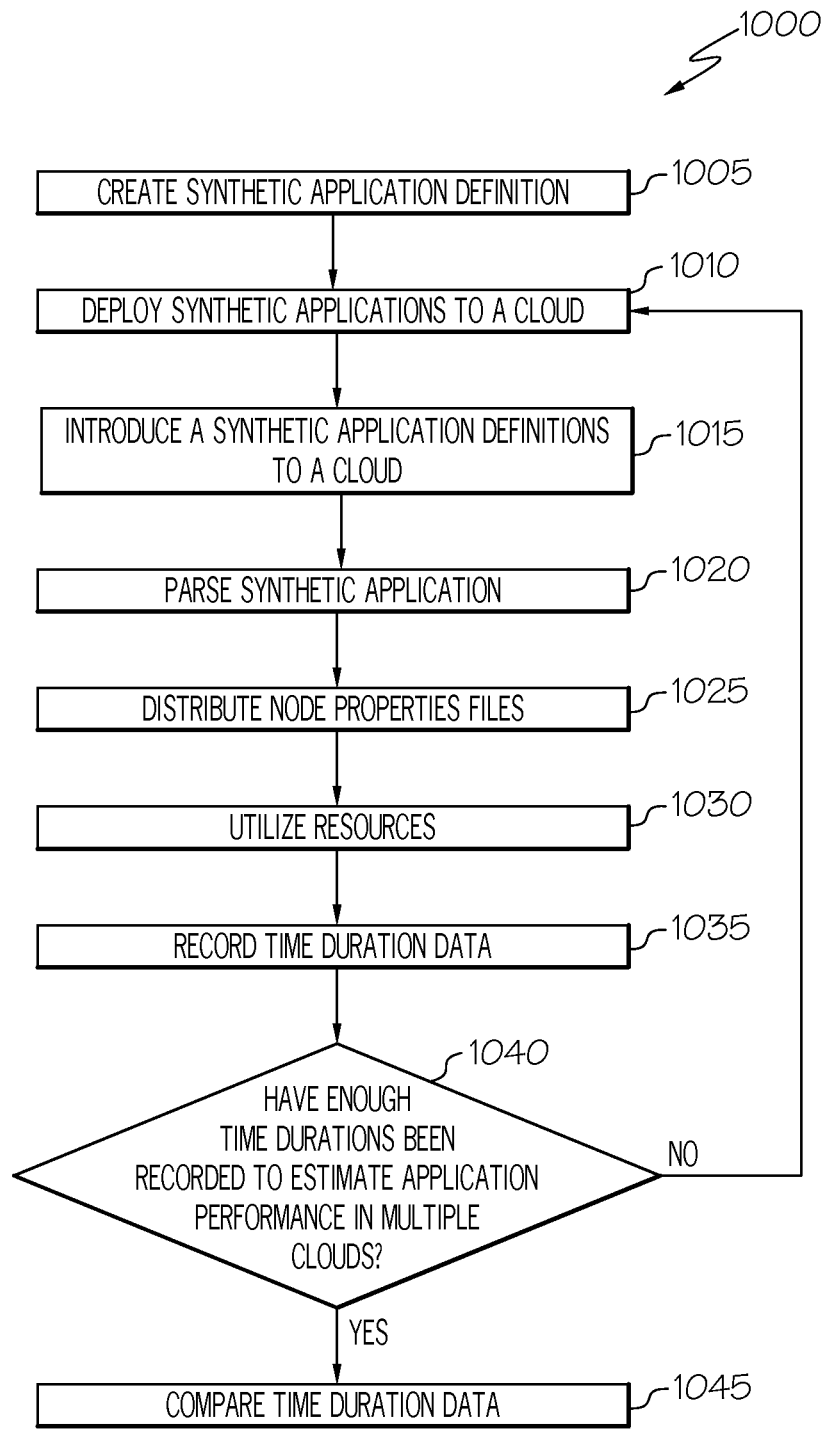
FIG. 10 is a flowchart of an exemplary method for performing application-specific assessment of cloud hosting suitability of multiple clouds, in accordance with teachings of the present disclosure.

FIG. 10 is a flowchart of an exemplary method 1000 for operating an application-specific assessment of cloud hosting suitability of multiple clouds, in accordance with the teachings of the present disclosure. Although FIG. 10 discloses a particular number of steps to be taken with respect to exemplary method 1000, method 1000 may be executed with more or fewer steps than those depicted in FIG. 10. In addition, although FIG. 10 discloses a certain order of steps to be taken with respect to method 1000, the steps of these methods may be completed in any suitable order. Method 1000 may be implemented using the system of FIGS. 1-5, 7, 9, 11, 13, or any other suitable mechanism. In certain embodiments, method 1000 may be implemented partially or fully in software embodied in computer-readable storage media. Method 1000 may be provided as a computer program product that may include one or more machine readable media having stored thereon instructions that may be used to program a processing system or other electronic device to perform the methods.

Method 1000 may begin, for example, at step 1005 with the creation of a synthetic application definition. Synthetic application definition may describe sequences of resource consumptions which approximate the behavior of a particular real-world application or group of applications.

At step 1010, synthetic applications may be deployed to a cloud, for example cloud 902 or 904 of FIG. 9. Nodes may include, for example, a server (e.g., blade server or rack server), personal computer (e.g., desktop or laptop), tablet computer, mobile device (e.g., personal digital assistant (PDA) or smart phone), network storage device, printer, switch, router, data collection device, virtual machine, script, executable, firmware, library, shared library, function, module, software application, or any other suitable device or application. Synthetic applications may be deployed to nodes by use of a network or any other suitable means of deploying synthetic applications.

At step 1015, synthetic application definitions may be introduced to one or more synthetic applications of nodes of a cloud, for example synthetic application definition 980 of FIG. 9. Synthetic application definitions may be distributed to nodes by use of a network or any other suitable means of deploying synthetic application definition. An instance of synthetic application to which a synthetic application definition is distributed may be referred to as a master instance of synthetic application.

At step 1020, synthetic application modules of a synthetic application may parse a synthetic application definition. Parsing a synthetic application definition may include parsing a registry, parsing business functions, parsing node properties, or referring to default parameters to supply parameter values, as shown, for example, in FIGS. 1, 5, 6, and 9.

At step 1025, synthetic application modules may distribute node properties to other instances of synthetic application modules. For example, node properties may be distributed to one or more instances of synthetic application described in child flows of node properties. Node properties may be distributed to instances of synthetic applications via a network or any other suitable means of distribution.

At step 1030, synthetic application modules may commence consuming resources of a computing system. Instances of synthetic application modules may consume resources of nodes of a computing system. For example, synthetic application modules may consume processing resources, storage resources, memory resources, network resources, and/or any other suitable resource associated with nodes of a computing system. Resource consumption may be effectuated based upon parameters included in node properties. Consumption of resources may begin, for example, by one or more master instances of synthetic application issuing resource consumption requests according to workloads in synthetic applications definitions. Issuing consumption requests may also include beginning data collection of time durations between requests and replies.

At step 1035, after completing resource consumptions of nodes of a computing system, synthetic application modules may send replies to parent instances of synthetic application modules. Receipt of replies may initiate recording of time duration data between requests and replies. Time duration data may be stored in a storage resource of a node, as shown in FIG. 9.

At step 1040, if sufficient time duration data to compare performance of an application in one or more clouds is available, the method may proceed to step 1045. If sufficient data is not available, the method may return to step 1010, where a new synthetic application may be deployed to one or more different clouds. A synthetic application may be deployed to the different clouds in step 1115. Sufficient data may be available when a synthetic application definition has been used to generate time duration data in multiple clouds. Any suitable number of synthetic applications or clouds may be used.

At step 1045, time duration data corresponding to resource consumptions according to synthetic application definitions in multiple clouds may be evaluated. For example, time duration data corresponding to a synthetic application definition in one cloud may be compared to time duration data corresponding to a synthetic application definition in a different cloud. In other embodiments, time duration data corresponding to a synthetic application in a particular cloud may be compared to threshold performance requirements. Any suitable method of evaluating time duration data may be used. Method 1000 may repeat with different synthetic applications, different synthetic application definitions, different clouds, or different nodes, or may terminate.

Figure 11:
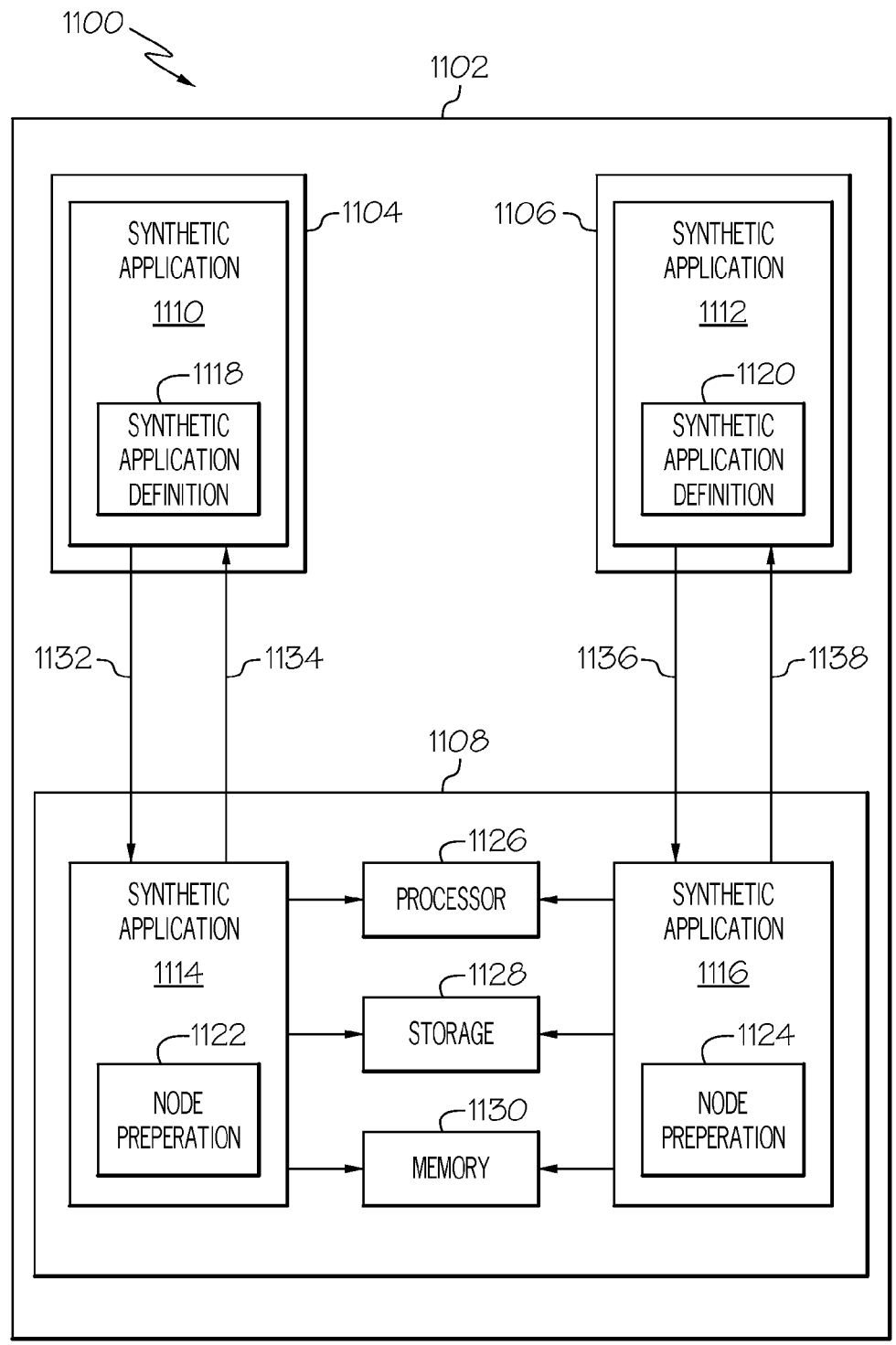
FIG. 11 is an illustration of an exemplary system for performing application-specific assessment of cloud hosting suitability for multiple applications in a node of a cloud, in accordance with teachings of the present disclosure.

FIG. 11 is an illustration of an exemplary system 1100 for performing application-specific assessment of cloud hosting suitability for multiple applications in a node of a cloud, in accordance with teachings of the present disclosure. System 1100, as shown in FIG. 11, may include clouds 1102. System 1100 may be configured to effectuate resource consumptions of nodes in clouds 1102. Cloud 1102 may include nodes 1104, 1106, and 1008. Nodes 1104 and 1106 may include synthetic applications 1110 and 1112, respectively. Node 1108 may include synthetic applications 1114 and 1116. Node 1108 may include associated processor 1126, storage 1128, and/or memory 1130.

In some embodiments of the invention, synthetic applications may be configured to estimate performance impacts of hosting multiple applications or portions of applications in a single node. A particular real-world application may share computing resources of nodes with other real-world applications. For example, if a third-party customer purchases Infrastructure as a Service from a vendor of cloud services, the vendor may host multiple third-party applications on a single physical node. For example, physical nodes may host multiple virtual machine nodes. In another example, if a third-party is purchasing Infrastructure as a Service, a particular set of physical resources may be allocated to a particular virtual machine. It may be desirable to estimate the impact of including more, fewer, or different combinations of applications within a particular virtual machine, on a particular host, or in a particular cloud. In one embodiment of the invention, multiple instances of synthetic applications configured to represent virtual machines may be deployed in a single physical node.

Additionally, particular physical nodes may be designated to host multiple real-world applications. In one embodiment of the invention, multiple instances of synthetic applications within a single node may be configured based on synthetic application definitions describing resource consumptions of one or more real-world applications. For any suitable reason, it may be desirable to estimate the performance of a real-world application sharing computing resources with other real-world applications.

In one embodiment of the invention, synthetic application definitions 1118 and 1120 may be introduced to synthetic applications 1110 and 1112, respectively. Synthetic applications 1110 and 1112 may parse synthetic application definitions 1118 and 1120, respectively. Synthetic application 1110 may distribute node properties 1122 to synthetic application 1114 in node 1108. Synthetic application 1112 may distribute node properties 1124 to synthetic application 1116 in node 1108. Once instances of synthetic applications described in business functions of synthetic application definitions 1118 and 1120 have node properties, synthetic applications 1110 and 1112 may, based upon business functions in synthetic application definitions 1118 and 1120, respectively, begin consuming resources of nodes in cloud 1102. For example, synthetic application 1110 may send one or more requests 1132 to synthetic application 1114. Synthetic application 1112 may send one or more requests 1136 to synthetic application 1116. Synthetic applications 1110 and 1112 may begin measuring time durations for instances of requests 1132 1136, respectively. Responsive to such requests, synthetic applications 1114 and 1116 may initiate resource consumptions of node 1108. For example, synthetic application 1114 may consume processing resources 1126, storage resources 1128, and/or memory resources 1130. Synthetic application 1116 may consume processing resources 1126, storage resources 1128, and/or memory resources 1130.

After completing resource consumptions, synthetic applications 1114 and 1116 may send replies 1134 and 1138 to synthetic applications 1110 and 1112, respectively. Synthetic application 1110 may finish measuring time durations for each request 1132 based upon replies 1134. Synthetic application 1112 may finish measuring time durations for each request 1136 based upon replies 1138. Synthetic application 1110 may store time duration data measured by synthetic application 1110 in storage or memory of node 1104. Synthetic application 1112 may store time duration data measured by synthetic application 1112 in storage or memory of node 1106.

Using time duration data measured from resource consumptions effectuated based on synthetic application definitions 1118 and 1120 in cloud 1102, performance characteristics of multiple real-world applications in a cloud may be evaluated. For example, time durations derived from synthetic applications 1118 1120 may be compared to a threshold performance requirement. Comparisons may be implemented using processing, memory, or storage resources of any suitable node. For example, one or more nodes in system 1100 may include computer program code for evaluating time duration data. In other embodiments, one or more nodes in system 1100 may include computer program code for comparing time durations data to threshold time duration values. Based upon comparisons of time durations with threshold performance requirements, system 1100 may deploy a selected number of instances of real-world applications to a node, such as node 1108. Instances of real-world applications may include applications upon which synthetic application definitions 1118 and 1120 are based.

In one embodiment, if a number of synthetic applications in cloud 1102 operate within performance thresholds, system 1100 may launch a similar number of real-world applications in cloud 1102. In another embodiment, if synthetic applications in cloud 1102 do not meet performance thresholds, system 1100 may launch fewer instances of real-world applications in cloud 1102.

Figure 12:
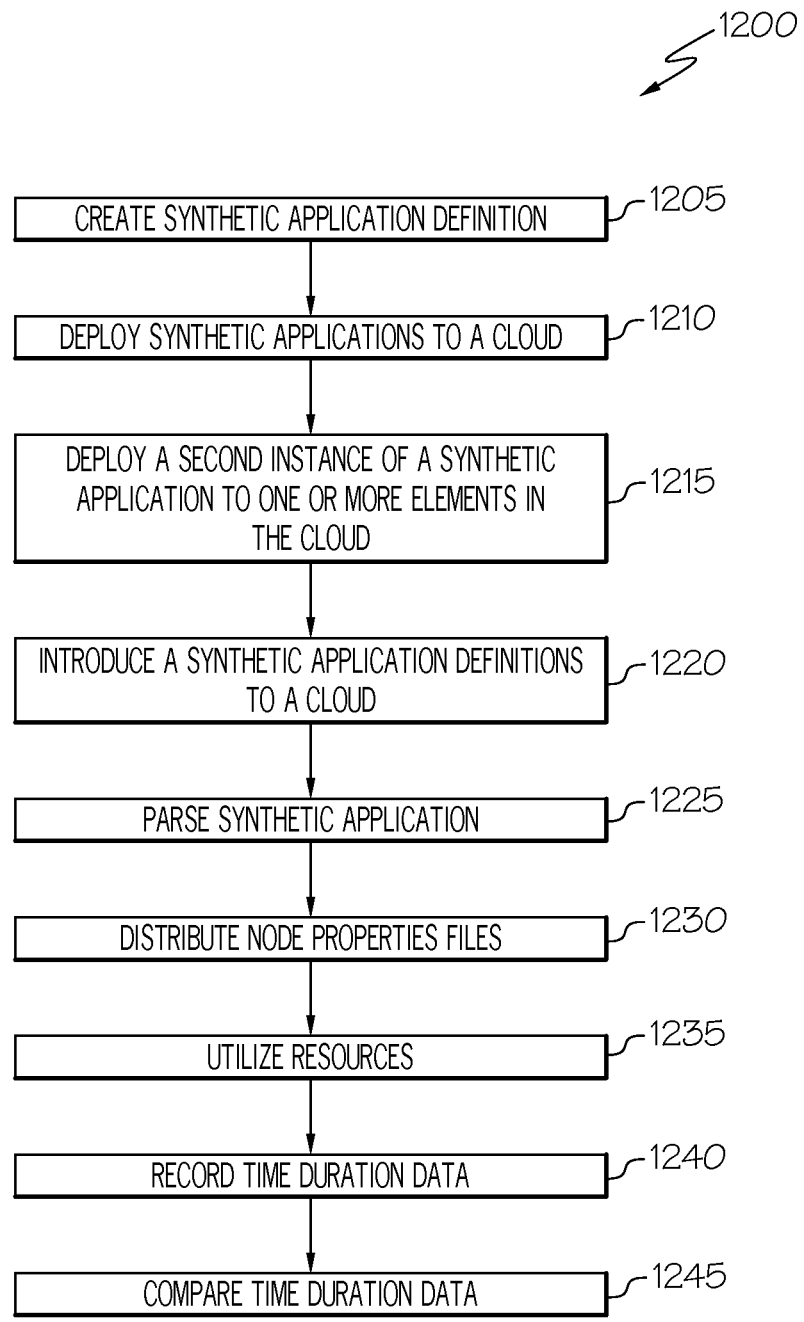
FIG. 12 is a flowchart of an exemplary method for performing application-specific assessment of cloud hosting suitability of multiple applications in a node of a cloud, in accordance with teachings of the present disclosure.

FIG. 12 is a flowchart of an exemplary method 1200 for performing application-specific assessment of cloud hosting suitability of multiple applications in a node of a cloud, in accordance with teachings of the present disclosure. Although FIG. 12 discloses a particular number of steps to be taken with respect to exemplary method 1200, method 1200 may be executed with more or fewer steps than those depicted in FIG. 12. In addition, although FIG. 12 discloses a certain order of steps to be taken with respect to method 1200, the steps of these methods may be completed in any suitable order. Method 1200 may be implemented using the system of FIGS. 1-5, 7, 9, 11, 13, or any other suitable mechanism. In certain embodiments, method 1200 may be implemented partially or fully in software embodied in computer-readable storage media. Method 1200 may be provided as a computer program product that may include one or more machine readable media having stored thereon instructions that may be used to program a processing system or other electronic device to perform the methods.

Method 1200 may begin, for example, at step 1205 with the creation of a synthetic application definition. Synthetic application definition may describe sequences of resource consumptions which approximate the behavior of a particular real-world application or group of applications.

At step 1210, synthetic applications may be deployed to a cloud, for example cloud 1102 of FIG. 11. Nodes may include, for example, a server (e.g., blade server or rack server), personal computer (e.g., desktop or laptop), tablet computer, mobile device (e.g., personal digital assistant (PDA) or smart phone), network storage device, printer, switch, router, data collection device, virtual machine, script, executable, firmware, library, shared library, function, module, software application, or any other suitable device or application. Synthetic applications may be deployed to nodes by use of a network or any other suitable means of deploying synthetic applications.

At step 1215, one or more additional instances of synthetic applications may be deployed to particular nodes in the cloud, for example node 1108 of FIG. 11. Synthetic applications may be deployed to nodes by use of a network or any other suitable means of deploying synthetic applications. Synthetic applications may be deployed to nodes by use of a network or any other suitable means of deploying synthetic applications.

At step 1220, synthetic application definitions may be introduced to one or more synthetic applications of nodes of a cloud, for example synthetic application definition 1118 or 1120 of FIG. 11. Synthetic application definitions may be distributed to nodes by use of a network or any other suitable means of deploying synthetic application definition. An instance of synthetic application to which a synthetic application definition is distributed may be referred to as a master instance of synthetic application.

At step 1225, synthetic application modules of a synthetic application may parse a synthetic application definition. Parsing a synthetic application definition may include parsing a registry, parsing business functions, parsing node properties, or referring to default parameters to supply parameter values, as shown, for example, in FIGS. 1, 5, 6, and 11.

At step 1230, synthetic application modules may distribute node properties to other instances of synthetic application modules. For example, node properties may be distributed to one or more instances of synthetic application described in child flows of node properties. Node properties may be distributed to instances of synthetic applications via a network or any other suitable means of distribution.

At step 1235, synthetic application modules may commence consuming resources of a computing system. Instances of synthetic application modules may consume resources of nodes of a computing system. For example, synthetic application modules may consume processing resources, storage resources, memory resources, network resources, and/or any other suitable resource associated with nodes of a computing system. Resource consumption may be effectuated based upon parameters included in node properties. Consumption of resources may begin, for example, by one or more master instances of synthetic application issuing resource consumption requests according to workloads in synthetic applications definitions. Issuing consumption requests may also include beginning data collection of time durations between requests and replies.

At step 1240, after completing resource consumptions of nodes of a computing system, synthetic application modules may send replies to parent instances of synthetic application modules. Receipt of replies may initiate recording of time duration data between requests and replies. Time duration data may be stored in a storage resource of a node, as shown in FIG. 7 or 9.

At step 1245, time duration data corresponding to resource consumptions according to synthetic application definitions in multiple clouds may be evaluated. For example, time duration data corresponding to a synthetic application definition in one cloud may be compared to time duration data corresponding to a synthetic application definition in a different cloud. In other embodiments, time duration data corresponding to a synthetic application in a particular cloud may be compared to threshold performance requirements. Any suitable method of evaluating time duration data may be used. Method 1200 may repeat with different synthetic applications, different synthetic application definitions, or different nodes, or may terminate.

Figure 13:
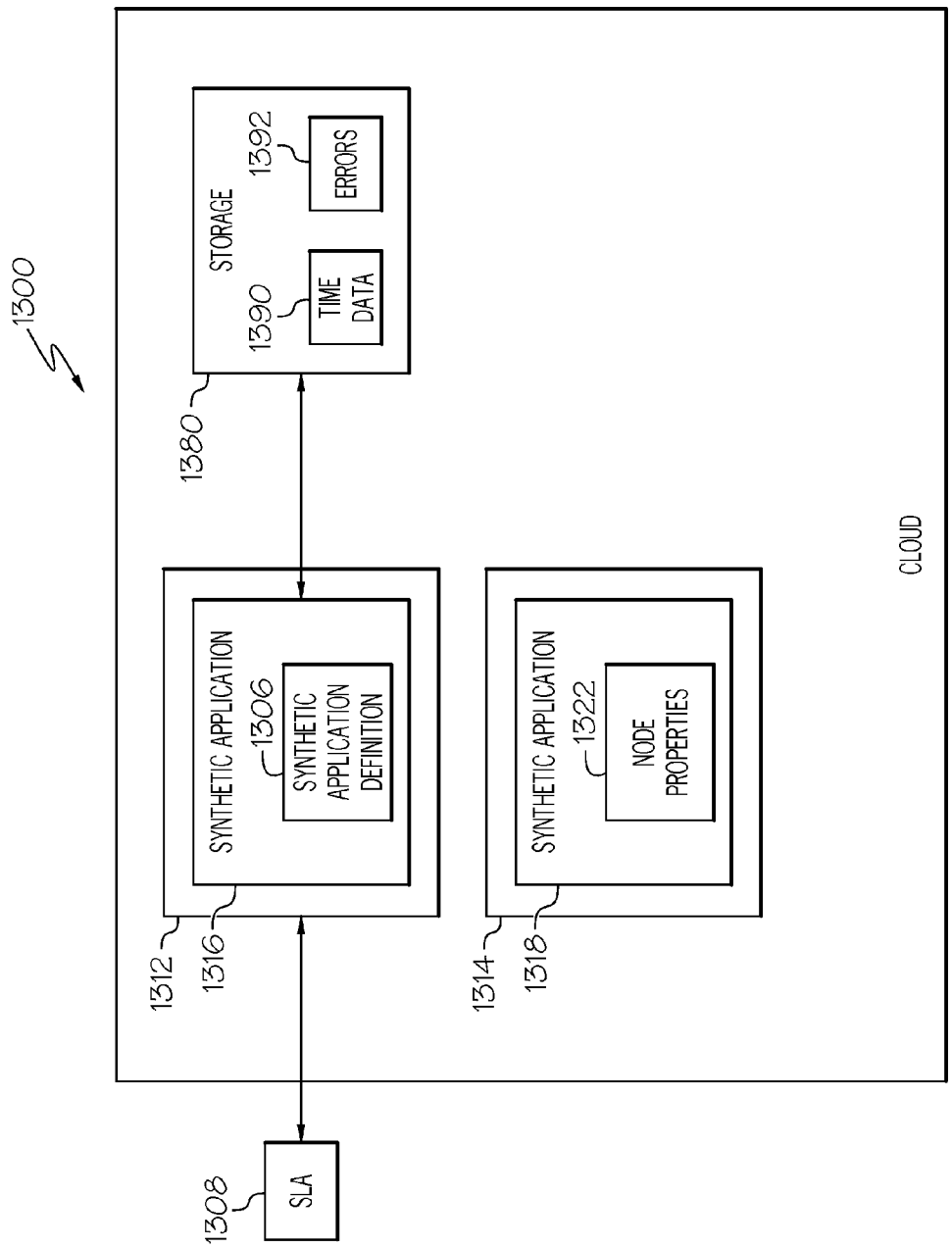
FIG. 13 is an illustration of an exemplary system for performing service-level agreement assessment of a cloud, in accordance with teachings of the present disclosure.

FIG. 13 is an illustration of an exemplary system 1300 for performing service-level agreement (SLA) assessment of a cloud. An SLA may define capacities, capabilities, or configurations of a cloud such as cloud 1302 that are to be available for users of cloud 1302. An SLA may be granted by, for example, a service provider to customers who pay for use of cloud 1302. The capacities, capabilities, or configurations of cloud 1302 may be specified by an SLA in any suitable manner, such as processing capabilities, overall network throughput, node-to-node network throughput, storage space, temporal requirements, response times, uptime, failure rates, data rates, or minimum or average requirements.

Cloud 1302 may include any suitable number of nodes, such as nodes 1312, 1314. Nodes 1312 and 1314 may include synthetic applications 1316 and 1318, respectively.

Synthetic application 1316 may be configured as a master instance of a synthetic application. Furthermore, synthetic application 1316 may be configured to coordinate service-level agreement assessment of cloud 1302. Synthetic application 1316 may be configured to assess cloud 1302 in any suitable manner. In one embodiment, synthetic application 1316 may apply synthetic application definition 1306 to the synthetic application instances of cloud 1302.

In one embodiment, synthetic application definition 1306 may be generated from requirements specified in an SLA 1308. SLA 1308 may define capacities, capabilities, or configurations of cloud 1302 that are to be available to users of cloud 1302 as described above. Synthetic application definition 1306 may include specification of operations of synthetic applications 1316, 1318 that are configured to meet or exceed the capacities, capabilities, or configurations defined in SLA 1308.

For example, SLA 1308 may define that network throughput between node 1312 and 1314 must be at least a certain bandwidth X. Synthetic application definition 1306 may specify operation of synthetic applications 1316 and 1318 to exchange network traffic such that bandwidth X should be reached. Response times may be measured at each of synthetic applications 1316 and 1318 to measure actual bandwidth used during such an evaluation.

In another example, SLA 1308 may define that synthetic application 1318 must be able to sustain a certain number of writes Y to storage as received from synthetic application 1316 within a designated time frame, thus performing a business function of network shared storage. Synthetic application definition 1306 may specify operation of synthetic application 1316 to send information to synthetic application 1318 which may perform an associated number of writes to storage. Synthetic applications 1316, 1318 may record the time for their operations and store them as time data 1390 in, for example, storage 1380.

In other embodiments, synthetic application definition 1306 may be generated based upon a real-world application which is the subject of SLA 1308. Synthetic application definition 1306 may then be used to characterize the capabilities of a particular cloud to execute a real-world application in compliance with SLA 1308.

Comparisons of performance of cloud 1302 to requirements of SLA 1308 may be made by, for example, synthetic application 1316 or any other suitable portion of system 1300.

Synthetic application definition 1306 may be introduced to synthetic application 1316 in node 1312. Synthetic application 1316 may parse synthetic application definition 1306. Synthetic application may perform operations defined in synthetic application definition 1306 for various business functions, such as consumption of resource of node 1312 or communication with other nodes. Synthetic application 1316 may distribute node properties 1322 to synthetic application 1318 in node 1314. Synthetic application 1316 may send one or more requests to synthetic application 1318. Synthetic application 1316 may begin measuring time durations for instances of the requests. Responsive to such requests, synthetic application 1318 may initiate resource consumptions of node 1314. Synthetic application 1318 may send replies to synthetic application 1316. Synthetic application 1316 may finish measuring time data 1390 for requests and store time data 1390 in storage 1380. Additional properties may be issued to other synthetic application instances in cloud 1302 as defined by synthetic application definition 1306.

Any errors, time-outs, or other performance messages encountered during execution of synthetic applications 1316, 1318 may be reported to synthetic application 1316 and stored in storage 1380 as errors 1392. Such messages may arise, for example, from unavailability of a software or hardware node of cloud 1302 for a request from a synthetic application instance.

Using time data 1390, performance abilities of cloud 1302 may be evaluated. Such evaluations may be made by any suitable portion of system 1300, such as synthetic application 1316. In one embodiment, time data 1390 may be compared against performance thresholds to determine whether responses were made in accordance with requirements specified in SLA 1308. If time data 1390 meets such performance thresholds, then cloud 1302 may be providing services in accordance with SLA 1308. In another embodiment, errors 1392 may be analyzed to determine whether any requirements of SLA 1308 as specified in synthetic application definition 1306 have been missed during operation of synthetic applications 1316, 1318. If no requirements of SLA 1308 have been missed, then performance of cloud 1302 may be verified. Otherwise, failures of cloud 1302 may be identified through time data 1390 or errors 1392. The characteristics causing time data 1390 or errors 1392 may be identified as possible culprits for the failure of cloud 1302 to provide adequate service.

Figure 14:
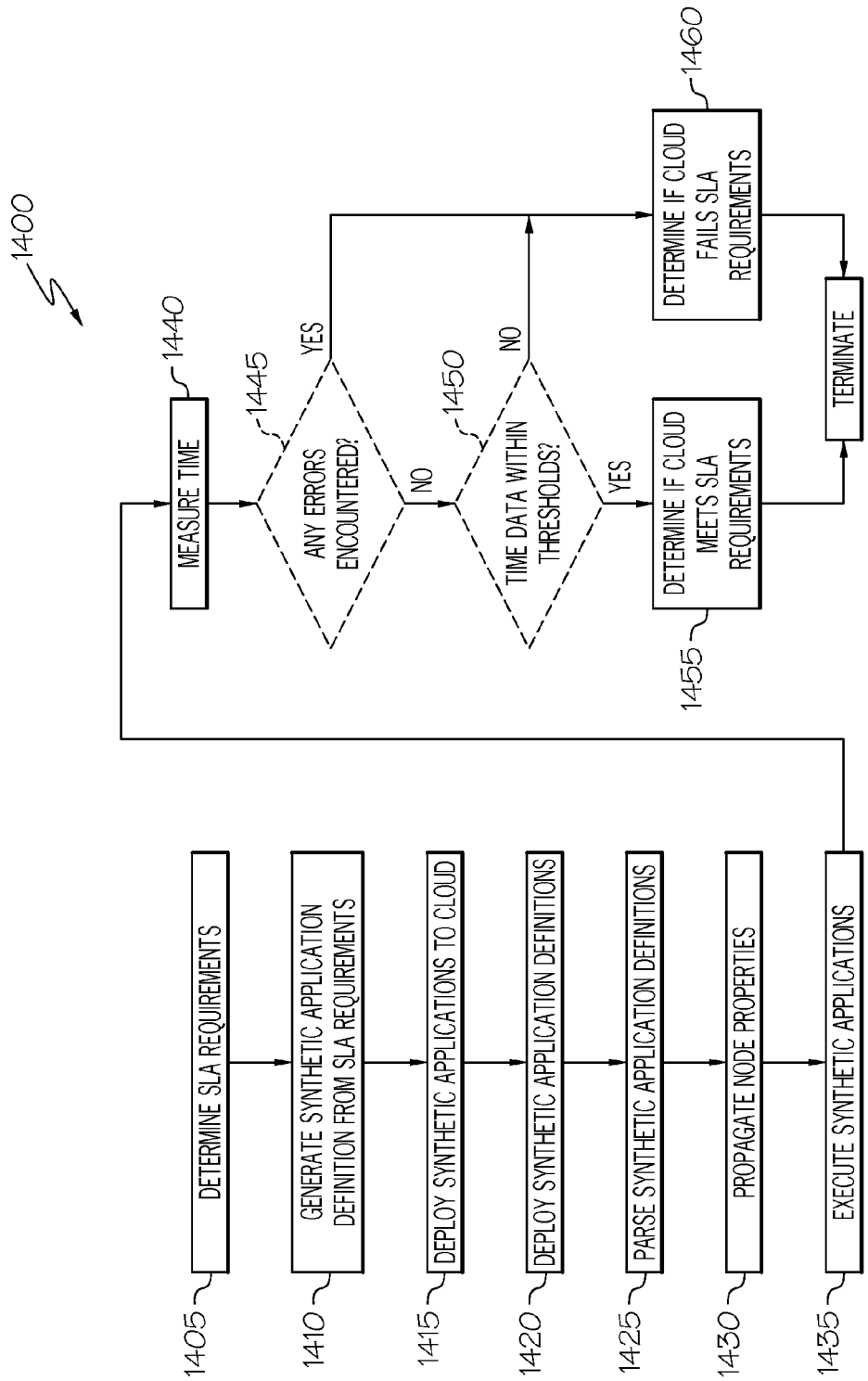
FIG. 14 is a flowchart of an exemplary method for performing service-level agreement assessment of a cloud, in accordance with teachings of the present disclosure.

FIG. 14 is a flowchart of an exemplary method 1400 for performing service-level agreement assessment of a cloud. Although FIG. 14 discloses a particular number of steps to be taken with respect to exemplary method 1400, method 1400 may be executed with more or fewer steps than those depicted in FIG. 14. In addition, although FIG. 14 discloses a certain order of steps to be taken with respect to method 1400, the steps of these methods may be completed in any suitable order. Method 1400 may be implemented using the system of FIGS. 1-5, 7, 9, 11, 13, or any other suitable mechanism. In certain embodiments, method 1400 may be implemented partially or fully in software embodied in computer-readable storage media. Method 1400 may be provided as a computer program product that may include one or more machine readable media having stored thereon instructions that may be used to program a processing system or other electronic device to perform the methods.

Method 1400 may begin, for example, at step 1405 with the determination of a set of criteria for an SLA defined in a digital format. The SLA may specify minimum resource levels that are to be available on a cloud. Such a definition may include, for example, a file, record, data structure, database entry, or any other suitable format.

At step 1410, a synthetic application definition may be created from the SLA requirements. Synthetic application definition may describe sequences of resource consumptions which meet the specific resource SLA requirements. These may approximate the behavior of a particular real-world application or group of applications.

At step 1415, synthetic applications may be deployed to a cloud, such as cloud 1302 of FIG. 13. Nodes may include, for example, a server (e.g., blade server or rack server), personal computer (e.g., desktop or laptop), tablet computer, mobile device (e.g., personal digital assistant (PDA) or smart phone), network storage device, printer, switch, router, data collection device, virtual machine, script, executable, firmware, library, shared library, function, module, software application, or any other suitable device or application. Synthetic applications may be deployed to nodes by use of a network or any other suitable means of deploying synthetic applications. One or more additional instances of synthetic applications may be deployed to particular nodes in the cloud, if specified in the synthetic application definition.

At step 1420, synthetic application definitions may be introduced to one or more synthetic applications of nodes of a cloud, for example synthetic application definition 1306 of FIG. 13. Synthetic application definitions may be distributed to nodes by use of a network or any other suitable means of deploying synthetic application definition. An instance of synthetic application to which a synthetic application definition is distributed may be referred to as a master instance of synthetic application.

At step 1425, synthetic application modules of a synthetic application may parse a synthetic application definition. Parsing a synthetic application definition may include parsing a registry, parsing business functions, parsing node properties, or referring to default parameters to supply parameter values.

At step 1430, synthetic application modules may distribute node properties to other instances of synthetic application modules. For example, node properties may be distributed to one or more instances of synthetic application described in child flows of node properties. Node properties may be distributed to instances of synthetic applications via a network or any other suitable means of distribution.

At step 1435, synthetic application modules may commence consuming resources of a computing system. Instances of synthetic application modules may consume resources of nodes of a computing system. For example, synthetic application modules may consume processing resources, storage resources, memory resources, network resources, and/or any other suitable resource associated with nodes of a computing system. Resource consumption may be effectuated based upon parameters included in node properties. Consumption of resources may begin, for example, by one or more master instances of synthetic application issuing resource consumption requests according to workloads in synthetic applications definitions. Issuing consumption requests may also include beginning data collection of time durations between requests and replies. Synthetic application modules may send replies to parent instances of synthetic application modules. Receipt of replies may initiate recording of time duration data between requests and replies.

At step 1440, time duration data may be stored in a storage resource of a node, as shown in FIG. 7, 9, or 13. Furthermore, any execution messages, errors, or time-outs may be stored. The time duration data and execution messages may be based upon execution of synthetic applications to perform their specified tasks.

At step 1445, data collected during execution may be evaluated. If any errors have been encountered, method 1400 may proceed to step 1460. Otherwise, method 1400 may proceed to step 1450. At step 1450, it may be determined whether execution of synthetic operations was completed within designated performance thresholds. Such thresholds may be established by, for example, derivation of requirements from the SLA. If the time thresholds are met by the recorded time data, then method 1400 may proceed to step 1455. Otherwise, method 1400 may proceed to step 1460.

At step 1455, it may be determined that the cloud upon which the synthetic applications executed meets SLA requirements. At step 1460, it may be determined that the cloud upon which the synthetic applications executed fails the SLA requirements. Method 1400 may repeat with different definitions or SLA requirements or may terminate.

The flowcharts and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, nodes, and/or components, but do not preclude the presence or addition of one or more other features, integers, steps, operations, nodes, components, and/or groups thereof.

The corresponding structures, materials, acts, and equivalents of any means or step plus function nodes in the claims below are intended to include any disclosed structure, material, or act for performing the function in combination with other claimed nodes as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
    defining, in a first synthetic application definition, a first plurality of resource consumptions, wherein the first plurality of resource consumptions are equivalent to consumptions by a first candidate application;
    the first synthetic application definition including a registry including a listing of a first plurality of nodes of a computing system;
    defining, in a second synthetic application definition, a second plurality of resource consumptions, wherein the second plurality of resource consumptions are equivalent to consumptions by a second candidate application;
    distributing the first synthetic application definition to a first synthetic application in a particular node of the first plurality of nodes;
    distributing the second synthetic application definition to a second synthetic application in the particular node of the computing system;
    parsing the registry to identify the first plurality of nodes;

parsing the first synthetic application definition to identify a first plurality of quantities of resources of the first plurality of nodes;

consuming, with the first synthetic application and based on the first synthetic application definition, a first plurality of quantities of resources of the first plurality of nodes of the computing system;

consuming, with the second synthetic application and based on the second synthetic application definition, a second plurality of quantities of resources of a second plurality of nodes of the computing system;

recording a performance of the first synthetic application and a performance of the second synthetic application;

evaluating the computing system based upon the recorded performances.

2. The method of claim 1, wherein the particular node is a virtual machine.

3. The method of claim 1, wherein the first candidate application and the second candidate application are instances of a same application.

4. The method of claim 1, wherein:

recording a performance of the first synthetic application comprises storing a first distribution of response times;

recording a performance of the second synthetic application comprises storing a second distribution of response times; and evaluating the computing system based upon the first performance and the second performance comprises comparing the first distribution of response times and the second distribution of response times to a performance requirement.

5. The method of claim 4, further comprising implementing the first candidate application and the second candidate application on the particular node based upon the comparison to the performance requirement.

6. The method of claim 1, further comprising:

iteratively adding third synthetic applications to the computing system for executing until a performance requirement is not met, the execution of each third synthetic application comprising:

defining, in a third synthetic application definition, a third plurality of resource consumptions, wherein the third plurality of resource consumptions are equivalent to consumptions by a third candidate application;

distributing the third synthetic application definition to a third synthetic application in the particular node of the computing system;

consuming a third plurality of quantities of resources of a third plurality of nodes of the computing system based upon the third synthetic application definition;

recording a performance of the third synthetic application, wherein determining that the performance requirement is not met is based upon a comparison of the first performance, the second performance, and the third performances to the performance requirement; and determining a maximum combination of first synthetic application, second synthetic application and third synthetic applications for which the performance requirement is met.

7. The method of claim 1, further comprising:

iteratively adding third synthetic applications to the computing system for execution until a performance requirement is not met, wherein:

the third synthetic applications utilize a third synthetic application definition; and the first synthetic application definition, the second synthetic application definition, and the third synthetic application definitions are for a same candidate application; and determining a maximum combination of first synthetic application, second synthetic application, and third synthetic applications for which the performance requirement is met.

8. A non-transitory computer-readable storage medium, comprising computer-executable instructions carried on the computer readable medium, the instructions readable by a processor and, when read and executed, configured to cause the processor to:

define, in a first synthetic application definition, a first plurality of resource consumptions and a registry including a listing of a first plurality of nodes of a computing system, wherein the first plurality of resource consumptions are equivalent to consumptions by a first candidate application;

define, in a second synthetic application definition, a second plurality of resource consumptions, wherein the second plurality of resource consumptions are equivalent to consumptions by a second candidate application;

distribute the first synthetic application definition to a first synthetic application in a particular node of the first plurality of nodes;

distribute the second synthetic application definition to a second synthetic application in the particular node of the computing system;

parse the registry to identify the first plurality of nodes;

parse the first synthetic application definition to identify a first plurality of quantities of resources of the first plurality of nodes;

consume, with the first synthetic application and based on the first synthetic application definition, a first plurality of quantities of resources of a first plurality of nodes of the computing system;

consume with the second synthetic application and based on the second synthetic application definition, a second plurality of quantities of resources of a second plurality of nodes of the computing system;

record a performance of the first synthetic application and a performance of the second synthetic application; and evaluate the computing system based upon the recorded performances.

9. The computer-readable storage medium of claim 8, wherein the particular node is a virtual machine.

10. The computer-readable storage medium of claim 8, wherein the first candidate application and the second candidate application are instances of a same application.

11. The computer-readable storage medium of claim 8, wherein:

recording a performance of the first synthetic application comprises storing a first distribution of response times;

recording a performance of the second synthetic application comprises storing a second distribution of response times; and evaluating the computing system based upon the first performance and the second performance comprises comparing the first distribution of response times and the second distribution of response times to a performance requirement.

12. The computer-readable storage medium of claim 8, wherein the instructions are further configured to cause the processor to:

iteratively add third synthetic applications to the computing system for execution until a performance requirement is not met, the execution of each third synthetic application comprising:
  define, in a third synthetic application definition, a third plurality of resource consumptions, wherein the third plurality of resource consumptions are equivalent to consumptions by a third candidate application;
  distribute the third synthetic application definition to a third synthetic application in the particular node of the computing system;
  consume a third plurality of quantities of resources of a third plurality of nodes of the computing system based upon the third synthetic application definition;
  record a performance of the third synthetic application, wherein determining that the performance requirement is not met is based upon a comparison of the first performance, the second performance, and the third performances to the performance requirement; and
determine a maximum combination of first synthetic application, second synthetic application and third synthetic applications for which the performance requirement is met.

13. The computer-readable storage medium of claim 8, wherein the instructions are further configured to cause the processor to:
  iteratively add third synthetic applications to the computing system for execution until a performance requirement is not met, wherein:
    the third synthetic applications utilize a third synthetic application definition; and
    the first synthetic application definition, the second synthetic application definition, and the third synthetic application definitions are for a same candidate application; and
  determine a maximum combination of first synthetic application, second synthetic application, and third synthetic applications for which the performance requirement is met.

14. An apparatus comprising:
a hardware processor; and
a memory communicatively coupled to the processor, the memory comprising instructions operable, when executed for causing the processor to:
  define, in a first synthetic application definition, a first plurality of resource consumptions and a registry including a listing of a first plurality of nodes of a computing system, wherein the first plurality of resource consumptions are equivalent to consumptions by a first candidate application;
  define, in a second synthetic application definition, a second plurality of resource consumptions, wherein the second plurality of resource consumptions are equivalent to consumptions by a second candidate application;
  distribute the first synthetic application definition to a first synthetic application in a particular node of the first plurality of nodes;
  distribute the second synthetic application definition to a second synthetic application in the particular node of the computing system;
  consume, with the first synthetic application and based on the first synthetic application definition, a first plurality of quantities of resources of a first plurality of nodes of the computing system;
  consume with the second synthetic application and based on the second synthetic application definition, a second plurality of quantities of resources of a second plurality of nodes of the computing system;
  record a performance of the first synthetic application and a performance of the second synthetic application; and
  evaluate the computing system based upon the recorded performances.

15. The apparatus of claim 14, wherein the particular node is a virtual machine.

16. The apparatus of claim 14, wherein the first candidate application and the second candidate application are instances of a same application.

17. The apparatus of claim 14, wherein:
  recording a performance of the first synthetic application comprises storing a first distribution of response times;
  recording a performance of the second synthetic application comprises storing a second distribution of response times; and
  evaluating the computing system based upon the first performance and the second performance comprises comparing the first distribution of response times and the second distribution of response times to a performance requirement.

18. The apparatus of claim 17, wherein the instructions further cause the processor to implement the first candidate application and the second candidate application on the particular node based upon the comparison to the performance requirement.

19. The apparatus of claim 14, wherein the instructions further cause the processor to:
  iteratively add third synthetic applications to the computing system for execution until a performance requirement is not met, the execution of each third synthetic application comprising:
    defining, in a third synthetic application definition, a third plurality of resource consumptions, wherein the third plurality of resource consumptions are equivalent to consumptions by a third candidate application;
    distributing the third synthetic application definition to a third synthetic application in the particular node of the computing system;
    consuming a third plurality of quantities of resources of a third plurality of nodes of the computing system based upon the third synthetic application definition;
    recording a performance of the third synthetic application, wherein determining that the performance requirement is not met is based upon a comparison of the first performance, the second performance, and the third performances to the performance requirement; and
  determine a maximum combination of first synthetic application, second synthetic application and third synthetic applications for which the performance requirement is met.

20. The apparatus of claim 14, wherein the instructions further cause the processor to:
  iteratively add third synthetic applications to the computing system for execution until a performance requirement is not met, wherein:
    the third synthetic applications utilize a third synthetic application definition; and the first synthetic application definition, the second synthetic application definition, and the third synthetic application definitions are for a same candidate application; and determine a maximum combination of first synthetic application, second synthetic application, and third synthetic applications for which the performance requirement is met.

* * * * *